US010486302B2

(12) United States Patent
Hayden

(10) Patent No.: US 10,486,302 B2
(45) Date of Patent: Nov. 26, 2019

(54) DEVICE FOR TRAVERSING AN OBJECT

(71) Applicant: WHITE PUMA PTY LIMITED, Hornsby, NSW (AU)

(72) Inventor: Gary James Hayden, Hornsby (AU)

(73) Assignee: WHITE PUMA PTY LIMITED, Hornsby (AU)

( * ) Notice: Subject to any disclaimer, the term of this patent is extended or adjusted under 35 U.S.C. 154(b) by 0 days.

(21) Appl. No.: 16/055,282

(22) Filed: Aug. 6, 2018

(65) Prior Publication Data
US 2018/0370018 A1 Dec. 27, 2018

Related U.S. Application Data

(63) Continuation-in-part of application No. 15/355,097, filed on Nov. 18, 2016, now Pat. No. 10,040,191.
(Continued)

(51) Int. Cl.
*F16M 13/00* (2006.01)
*B25J 5/00* (2006.01)
(Continued)

(52) U.S. Cl.
CPC .......... *B25J 5/005* (2013.01); *A01G 23/0955* (2013.01); *B25J 5/00* (2013.01); *B26D 7/02* (2013.01); *B62D 7/02* (2013.01); *B62D 55/06* (2013.01); *B62D 57/028* (2013.01); *B62D 61/00* (2013.01); *B66C 23/203* (2013.01); *B66F 9/065* (2013.01);
(Continued)

(58) Field of Classification Search
CPC ...... F16B 41/002; F16B 41/005; F16B 43/00; F16B 43/009; F16B 45/02; F16B 5/0004; F16B 5/0008; F16B 5/0233; F16B 5/0258; F16B 5/0614; F16B 5/0657
USPC ....... 248/228.1, 228.4, 230.1, 230.4, 231.51, 248/229.2, 226.11, 229.23, 229.13, 689, 248/245
See application file for complete search history.

(56) References Cited

U.S. PATENT DOCUMENTS 2,482,392 A 9/1949 Whitaker
4,793,439 A 12/1988 Crawford
(Continued)

FOREIGN PATENT DOCUMENTS

CA 2394680 A1 7/2001
CN 101664927 A 3/2010
(Continued)

OTHER PUBLICATIONS

Guan, et al., "Climbing Gaits of a Modular Biped Climbing Robot", 2009 IEEE/ASME International Conference on Advanced Intelligent Mechatronics, Suntec Convention and Exhibition Center, Singapore, Jul. 14-17, 2009, pp. 532-537.
(Continued)

*Primary Examiner* — Steven M Marsh
(74) *Attorney, Agent, or Firm* — Harness, Dickey & Pierce, P.L.C.

(57) ABSTRACT

A device for allowing work to be carried out on or about an object includes at least one gripping arrangement. The at least one gripping arrangement is configured to grip and traverse the object so as to reach a desired location on the object and to anchor the device thereto for allowing the work to be carried out.

12 Claims, 21 Drawing Sheets

Related U.S. Application Data which is a continuation of application No. 14/960,787, filed on Dec. 7, 2015, now Pat. No. 9,498,881, which is a continuation of application No. 13/880,140, filed as application No. PCT/AU2011/001326 on Oct. 19, 2011, now Pat. No. 9,205,554.

(60) Provisional application No. 61/394,764, filed on Oct. 19, 2010.

(51) Int. Cl.
| | | |
|---|---|---|
| *B66F 11/04* | (2006.01) | |
| *B26D 7/02* | (2006.01) | |
| *B62D 61/00* | (2006.01) | |
| *B62D 57/028* | (2006.01) | |
| *A01G 23/095* | (2006.01) | |
| *B62D 7/02* | (2006.01) | |
| *B62D 55/06* | (2006.01) | |
| *B66C 23/20* | (2006.01) | |
| *B66F 9/065* | (2006.01) | |
| *B66F 9/18* | (2006.01) | |

(52) U.S. Cl.
CPC .............. *B66F 9/183* (2013.01); *B66F 11/04* (2013.01); *B66F 11/044* (2013.01); *Y10T 83/667* (2015.04)

(56) References Cited

U.S. PATENT DOCUMENTS

| | | | |
|---|---|---|---|
| 4,893,512 A | 1/1990 | Tanimoto | |
| 5,535,973 A * | 7/1996 | Bailey | A61G 13/101 248/214 |
| 6,065,513 A | 5/2000 | Paakkunainen | |
| 6,591,940 B2 | 7/2003 | Desjardins | |
| 7,165,762 B1 * | 1/2007 | Duzick | B23K 3/087 269/45 |
| 7,454,858 B2 | 11/2008 | Griffin | |
| 8,201,787 B2 | 9/2012 | Ingram | |
| 8,322,454 B2 | 12/2012 | Connell et al. | |
| 8,464,986 B1 | 6/2013 | McClure | |
| 8,622,347 B2 | 1/2014 | Oyzerskiy | |
| 2003/0111137 A1 | 6/2003 | Nilsson | |
| 2004/0089778 A1 * | 5/2004 | Valentine | F16M 11/40 248/229.13 |
| 2006/0226314 A1 | 10/2006 | Dube et al. | |
| 2007/0181217 A1 | 8/2007 | Ahdoot | |
| 2010/0038505 A1 * | 2/2010 | Sonnenberg | F16M 11/041 248/226.11 |
| 2010/0108838 A1 * | 5/2010 | DeMartine | F16M 11/10 248/222.14 |
| 2011/0226554 A1 * | 9/2011 | Anderson | E04G 5/10 182/222 |
| 2015/0021451 A1 * | 1/2015 | Clearman | G03B 17/561 248/229.13 |
| 2015/0028608 A1 | 1/2015 | Wubbelmann | |

FOREIGN PATENT DOCUMENTS

| | | |
|---|---|---|
| CN | 101898357 | 12/2010 |
| EP | 542168 | 2/1997 |
| JP | 05261681 | 10/1993 |

OTHER PUBLICATIONS

Choi, et al., "The Design and Analysis of a Feeder Pipe Inspection Robot With an Automatic Pipe Tracking System", IEEE/ASME Transactions on Mechatronics, vol. 15, No. 5, Oct. 1, 2010, pp. 736-745.

Fukuda, et al., "Path Planning and Control of Pipeline Inspection and Maintenance Robot", Industrial Electronics Society, 1988, IECON '88 Proceedings, Oct. 24, 1988, pp. 38-43.

Tavakoli, et al., "3DClimber: A Climbing Robot for Inspection of 3D Human Made Structures", 2008 IEEE/RSJ International Conference on Intelligent Robots and Systems, Acropolis Convention Center, Nice, France, Sep. 22-26, 2008, pp. 4130-4135.

Lam, et al., "Linear-Time Path and Motion Planning Algorithm for a Tree Climbing Robot—TreeBot", 2010 IEEE/RSJ International Conference on Intelligent Robots and Systems, Taipei, Taiwan, Oct. 18-22, 2010, pp. 4988-4994.

\* cited by examiner

DEVICE FOR TRAVERSING AN OBJECT

FIELD OF THE INVENTION

The present invention relates to a method and apparatus for traversal of an object. The invention finds particular application in the field of tree lopping, although embodiments are not so limited and may extend to any application where an object is to be traversed and worked on or around.

DESCRIPTION OF THE BACKGROUND ART

In recent times there have been a number of developments in robotics. However a major problem still faced is the ability to traverse over various conditions, such as surfaces and objects.

Whilst solutions have been proposed, generally the solutions are very specific to the conditions which the robot is able traverse.

Thus, there is a need to substantially overcome, or at least alleviate, one or more disadvantages of existing arrangements, or to provide alternatives to existing arrangements.

SUMMARY OF THE PRESENT INVENTION

In accordance with a first aspect of the present invention there is provided a device for allowing work to be carried out on or about an object, the device including:
 at least one gripping arrangement, the at least one gripping arrangement being configured to grip and traverse the object so as to reach a desired location on the object and to anchor the device thereto for allowing the work to be carried out.

In an embodiment the gripping arrangement comprises first and second grappling legs pivotably connected to a body of the device, in use an end portion of each leg being arranged to move toward the other to thereby grip the object.

In an embodiment the device further comprises a displacement means for effecting the movement.

In an embodiment the displacement means comprises one or more hydraulic cylinders mounted to the grappling legs and the body for moving the end portions of each leg towards and away from each other.

In an embodiment the device further comprises a drive means mounted on each grappling leg at or adjacent the respective end portion for allowing the device to traverse the object.

In an embodiment, once the grappling legs have gripped the object, the drive means is lockable for anchoring the device to the object.

In an embodiment the respective drive means are each pivotable into and out of a grappling zone defined between the grappling legs.

In an embodiment the device further comprises an additional drive means mounted to the body between the grappling legs.

In an embodiment the drive means on each grappling leg comprises at least one of a powered wheel, roller and continuous track assembly.

In an embodiment the device further comprises a drive controller for controlling power to the drive means for enabling the device to traverse the object.

In an embodiment the device further comprises a cutting tool coupled to at least one of the body and one or more grappling legs for affecting a cutting action on or about the object.

In an embodiment the device further comprises an arm coupled to the body by way of a first rotator, the arm comprising a free end on which is located a coupling portion for coupling to a piece of equipment which facilitates the work done on or about the object.

In an embodiment the arm is segmented into two or more segments with adjacent segments being pivotable with respect to one another about a linkage point which links the respective segments.

In an embodiment the device further comprises a second rotator mounted on the free end of the arm and wherein the coupling portion is mounted on a rotating surface of the second rotator.

In an embodiment the arm comprises an extension portion for varying a length of the arm.

In an embodiment the piece of equipment is a personnel carrier arranged to carry personnel for doing the work on or about the object.

In an embodiment the coupling portion is pivotally and/or rotatably connected to another arm of another device as claimed in any one of the preceding claims, the device and the other device being configured to traverse the object together.

In an embodiment the arms are coupled together by way of at least one coupling rotator.

In an embodiment the traversing is effected by anchoring one of the devices to the object utilising the respective gripping arrangement while the other device pivotally and/or rotatably moves to a desired location on the object for subsequent anchoring thereto.

In an embodiment the object includes any one of: an elongate object; a tree; a utility pole; and a building.

In accordance with a second aspect of the present invention there is provided a method for carrying out work on or about an object, the method including:
 providing a device comprising at least one gripping arrangement, the at least one gripping arrangement being configured to grip and traverse the object;
 controlling the device so as to reach a desired location on the object and to anchor the device thereto for allowing the work to be carried out.

In an embodiment the gripping arrangement comprises first and second grappling legs pivotably connected to a body of the device and wherein the method comprises moving end portions of each leg toward one another to thereby grapple the object for facilitating the gripping and traversing.

In an embodiment a drive means is mounted on an end portion of each grappling leg and wherein the method comprises controlling the respective drive means to cause the device to traverse the object.

In an embodiment the drive means are each pivotable into and out of a grappling zone defined between the legs and wherein the method comprising pivoting the drive means out of the grappling zone for allowing the device to traverse along the ground once the device has separated from the object.

In an embodiment the drive means on each grappling leg comprises at least one of a powered wheel, roller and continuous track assembly.

In an embodiment the method further comprises pivotally and/or rotatably coupling the device to another device to thereby allow the devices to traverse the object together.

BRIEF DESCRIPTION OF THE DRAWINGS

Features and advantages of the present invention will become apparent from the following description of embodiments thereof, by way of example only, with reference to the accompanying drawings, in which.

DETAILED DESCRIPTION OF EMBODIMENTS

Figure 1:
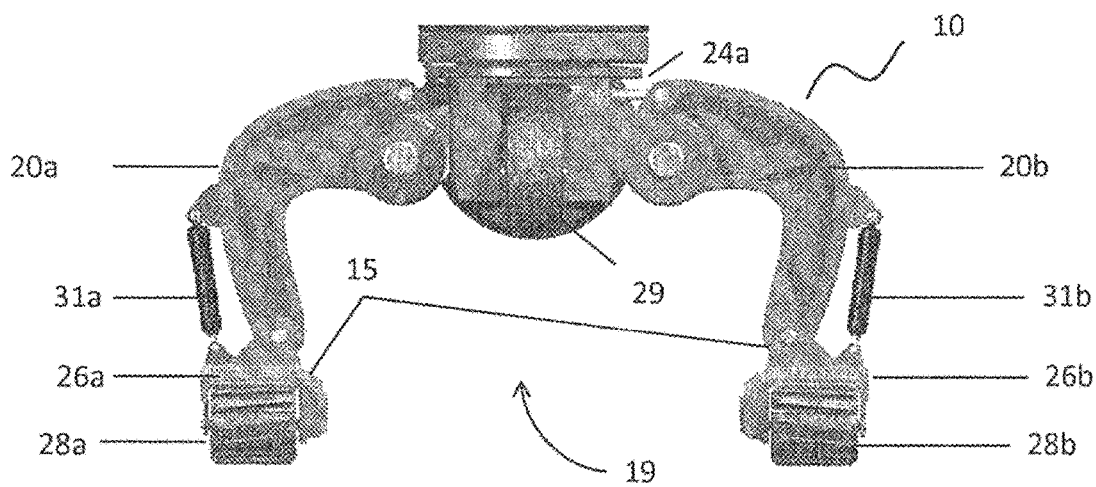
FIG. 1 is a schematic diagram of a device in accordance with an embodiment of the present invention.
Figure 2:
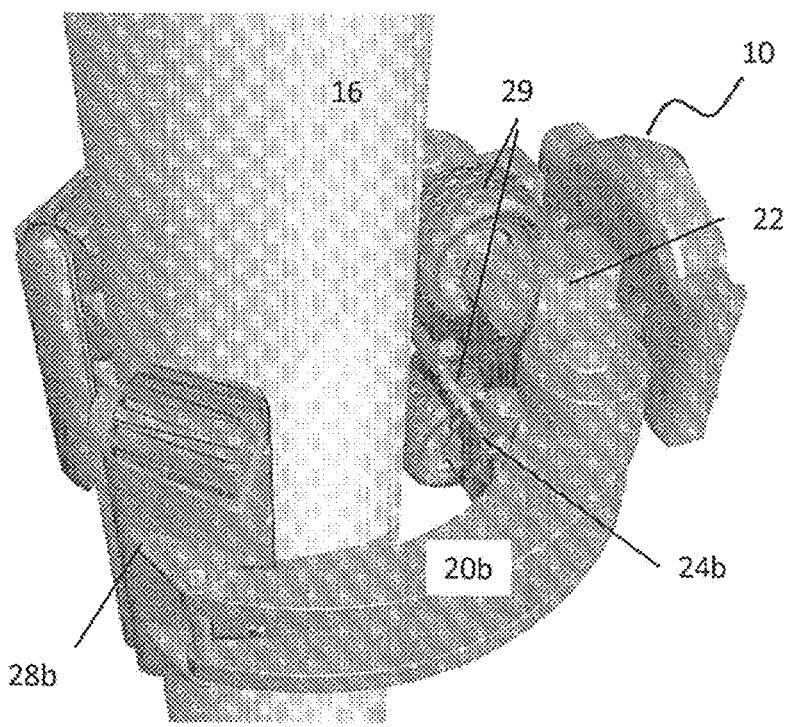
FIG. 2 is a close up view of the device of FIG. 1 gripping an object.

A device 10 for allowing work to be carried out on or about an object in accordance with a first embodiment of the present invention is shown in FIGS. 1 and 2.

The device 10 includes a gripping arrangement 15, which is configured to grip and traverse an object (in the illustrated embodiment being in the form of an elongate pole 16) so as to reach a desired location on the object 16 for allowing the work to be carried out.

The gripping arrangement 15 comprises first and second grappling legs 20a, 20b which are pivotally connected to a body 22 of the device 10. A displacement means in this example embodiment being in the form of a pair of hydraulic cylinders 24a, 24b couple to the grappling legs 20a, 20b and are operable to move the grappling legs 20a, 20b with respect to the body 22. Such a configuration allows end portions 26a, 26b of each leg to move toward one another to thereby pinch and grip the object. This is best shown in FIG. 2.

Figure 3:
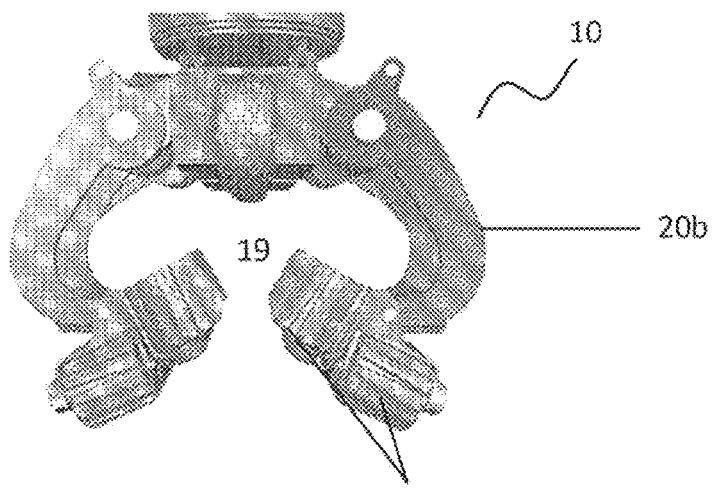
FIG. 3 is a schematic showing an alternative drive means for the FIG. 1 device.

A drive means is provided on each of the legs 20a, 20b for allowing the device to traverse the object. In the illustrated embodiment of FIG. 1, the drive means is in the form of a pair of continuous tracks 28a, 28b which are each operatively connected to a respective leg and which, in combination, serve not only to affect the traversing function but also to grip the object 16, once the grappling legs 20a, 20b have been pivoted into engagement with the object 16. Once the device 10 has traversed to a desired location on the object 16, the drive means 28 can be locked to thereby anchor the device 10 to the object 16 for allowing the work to be carried out. A slightly alternative embodiment is shown in FIG. 3, whereby the drive means on each leg comprises two continuous tracks 28 which are oriented in different planes.

It will be understood that the drive means 28a, 28b can include any one or a combination of a continuous track (as shown), a rolling assembly, a rolling chain, and/or wheels. In the illustrated embodiment, each of the tracks 28a, 28b include a chain drive which is powered by separate 2-stroke engines mounted on the respective legs (not shown). It will be understood that other power sources may equally be applicable for powering the drive means, including, for example, a hydraulic power source, pneumatic power source or electric power source, as will be well understood by persons skilled in the art. As will be described in more detail in subsequent paragraphs with reference to FIGS. 9 and 10, where the device 10 is paired to one or more other devices 10', the drive means may instead be in the form of a grab, magnets, or a suction device, in order to allow for the object 16 to be gripped and traversed. The device 10 may include one or more rollers 29 which may or may not be powered for assisting the device 10 when traversing the object as is best shown in FIG. 2. According to the FIG. 2 embodiment, the device 10 includes a pair of rollers 29 mounted to the body 22.

In one form the drive means 28a, 28b may be pivotable with respect to the leg on which it is mounted. For example, with reference to FIG. 2 each of the drive means 28a, 28b is pivotable into a grappling zone 19 defined between the legs 20a, 20b for gripping and traversing the object 16. In FIG. 1, on the other hand, the drive means 28a, 28b have been pivoted out of the grappling zone 19. This may be advantageous for disengaging from the object 16 and for driving the device 10 over the ground to or from the object 16, for example. Again, the pivoting action can be affected by any suitable means but according to the illustrated embodiment is achieved by way of hydraulic cylinders 31a, 31b. The hydraulic cylinders 31a, 31b may, for example, be driven by the same hydraulic drive system used to drive the leg pivot cylinders 24a, 24b. In one embodiment the hydraulic drive system 25 (including a suitable motor and generator) is mounted in or on an extension arm 35 as will be described in more detail in subsequent paragraphs with reference to FIGS. 9 and 10.

Figure 4:
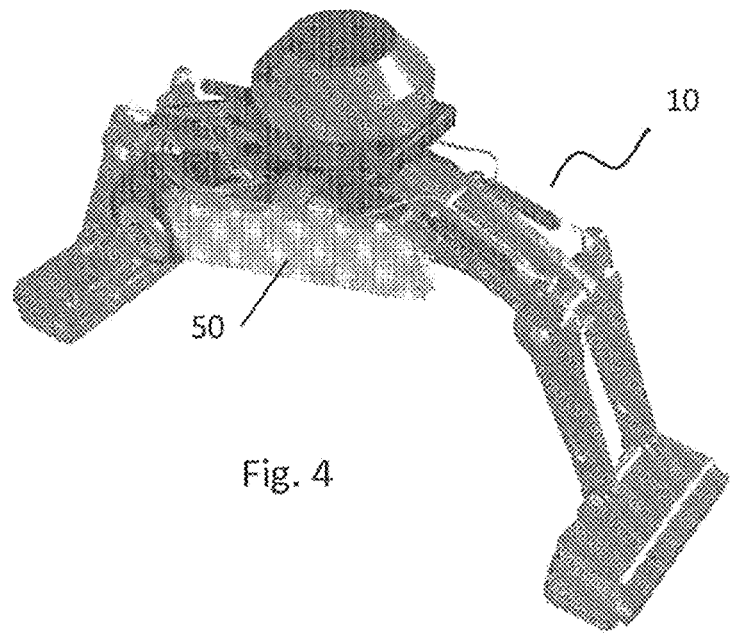
FIG. 4 is a schematic of a device in accordance with an embodiment of the present invention, with a cutting tool attachment coupled thereto.
Figure 8:
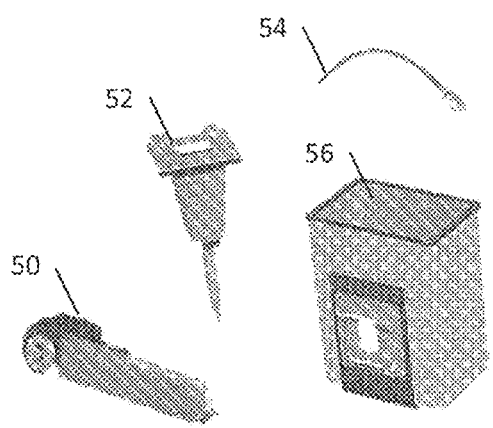
FIG. 8 shows a number of work tools that can be coupled to the FIG. 5 device.

Furthermore, the device 10 can include a tool, or the like, which is configured to be used on or in conjunction with the object for carrying out the work. Thus, for example, the device 10 may include a saw 50 (as shown in FIG. 4), a shredder (see FIG. 18), or the like, which can be used to interact with the object 16, such as to remove branches of a tree once the device traverses the tree (as will be described in more detail in subsequent paragraphs with reference to FIGS. 11 through 14). It will be appreciated that many other forms of tools can be utilised which can be readily interchanged with the device 10, a few of which are shown schematically in FIG. 8. From left to right, the tools include a chainsaw 50, a jackhammer 52, a hose 54 and a personnel carrier 56. It will be understood by persons skilled in the art that the device may include more than one tool.

Figure 5A:
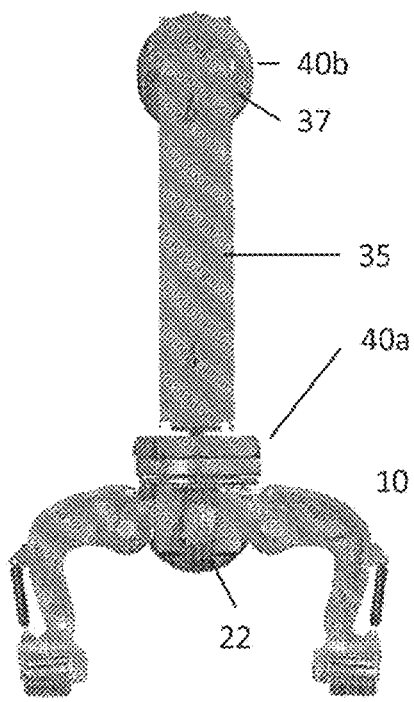
FIG. 5a is a schematic of the FIG. 1 device coupled to an extension arm.

With reference to FIG. 5a, the device 10 may additionally comprise a manipulatable arm 35 which is coupled to the body 22 by way of a rotator 40a, such as a hydraulic rotator. An example hydraulic rotator suitable for use with embodiments described herein is the PZR450G-62 rotator manufactured by Kinshofer with continuous geared rotation (further details available at www.kinshofer.com). It will be understood that the manipultable arm 35 may be mounted directly to a rotating surface of the hydraulic rotator (e.g. welded, integrally formed, etc.) or may be removably coupled thereto. It will also be understood that the coupling between the arm 35 and the device 10 may pivotable, rotatable or a combination of the two depending on the desired implementation.

Figure 5B:
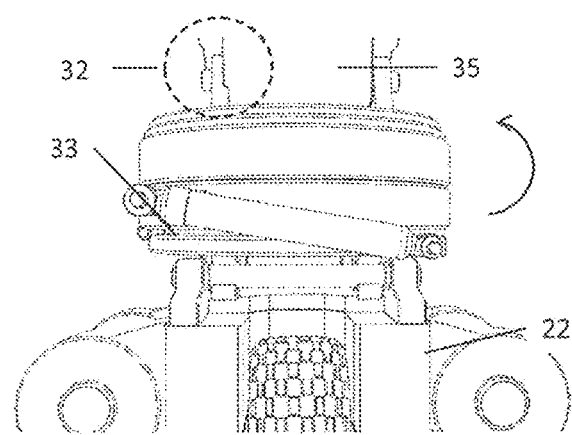
FIG. 5b is a schematic of an example device/arm coupling in accordance with an embodiment.

One example removable coupling which incorporates both pivotable and rotatable functionality is shown in FIG. 5b, whereby the arm 35 is coupled to the rotator surface by way of a locking pin configuration 32 (with the same type of configuration used to removably couple the rotator 40 to the device body 22). In this example the pivoting functionality is provided by way of a hydraulic cylinder configuration 33 which mounts to both the rotator 40 and the device body 22. More robust pivoting arrangements may be employed depending on the desired implementation. For example, the device 10 may employ a rotary tilt hitch coupling as manufactured by Doherty Engineering Attachments Ltd (see www.dohertydirect.net). It will be further understood that such a combined rotatable/pivotable configuration may be utilised for other linkage and coupling points employed by the device 10, as will be described in more detail in subsequent paragraphs.

Figure 6:
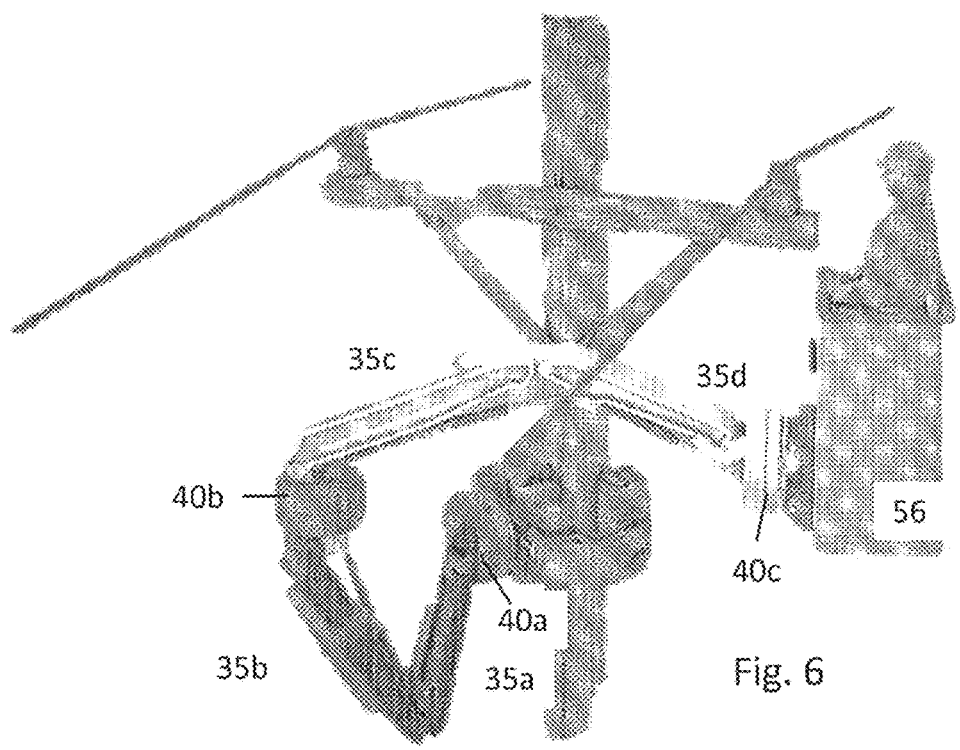
FIG. 6 is a schematic of the FIG. 5a device coupled to a personnel carrier via a plurality of extension arms.
Figure 7:
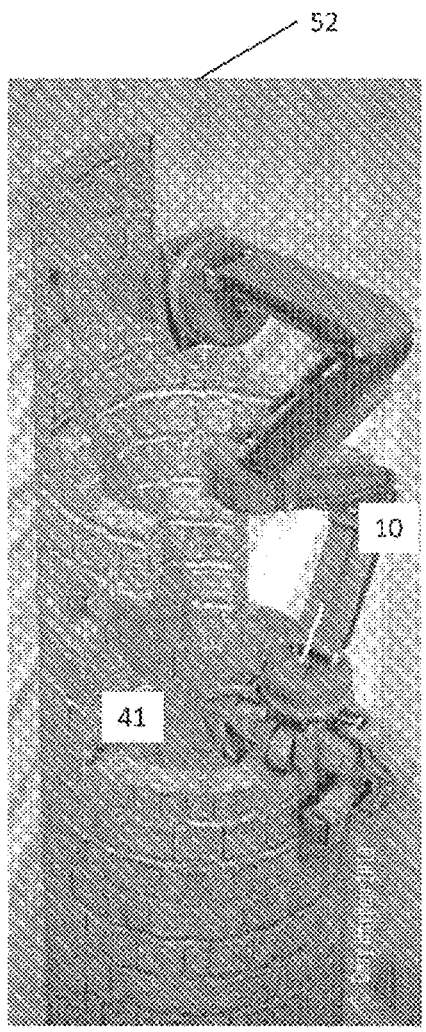
FIG. 7 is a schematic of the FIG. 5a device coupled to a jackhammer via a plurality of extension arms.

Returning to FIG. 5a, a coupling portion 37 is located on a free end 39 of the arm 35 for coupling to a tool (as hereinbefore described) or to another device as will be described in subsequent paragraphs. The coupling portion 37 may be mounted on a rotating surface of a second rotator 40b coupled to the free end 39 of the arm 35. It will be understood that the coupling portion 37 may take many forms, but according to the example embodiment described herein, is again in the form of a locking pin configuration which co-operates with a pin/lock on the coupled device/tool. The arm 35 may be segmented into two or more segments with adjacent segments being pivotable and/or rotatable about a linkage point 42 which links the adjacent segments. Again, the pivoting may be facilitated by way of a hydraulic cylinder or the like. In addition, or as an alternative thereto, a rotator 40c may be provided at the linkage to increase the manoeuvrability of the arm 35. An example showing the device 10 coupled to a personnel bucket 56 by way of an arm including multiple segments 35a to 35d is shown in FIG. 6. It is noted that the segments 35c and 35d as well as the bucket 56 (and indeed any other desired part of the device 10) are made of an insulating material to suit the illustrated application (i.e. repair of high voltage power lines). FIG. 7 shows the device 10 coupled to a jackhammer tool 52 for deconstructing a smoke stack 41 to which it is anchored.

Figure 9:
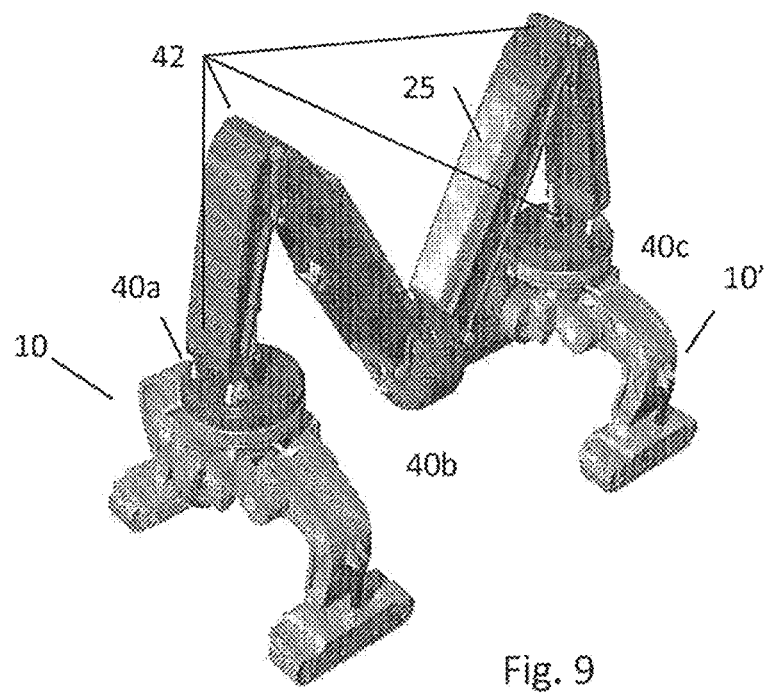
FIGS. 9 and 10 are perspective and side views respectively of a pair of the FIG. 5a devices coupled together, in accordance with an embodiment.
Figure 10:
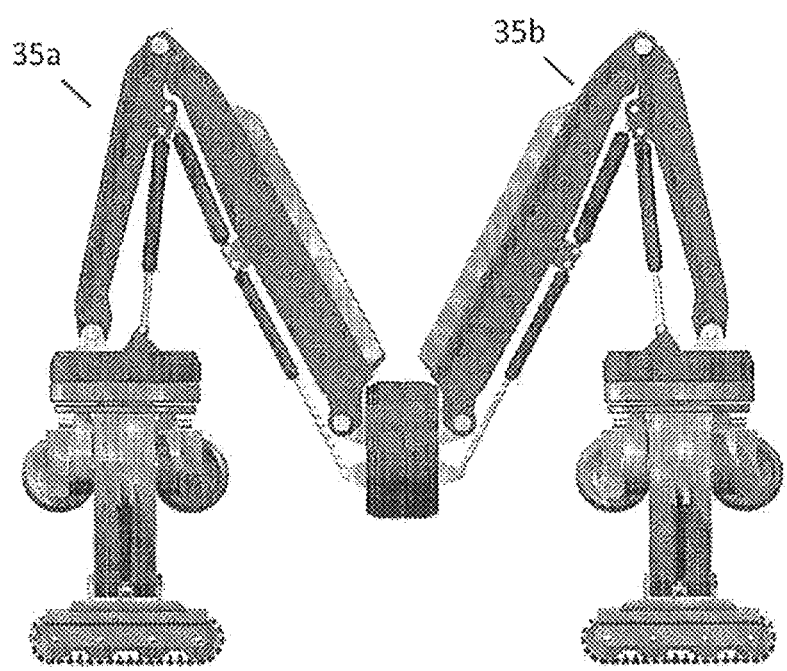

Accordingly, in yet a further example, the elongate arm 35 can be pivotally and/or rotatably connected to another device 10' with a respective gripping arrangement 15, as is shown in FIGS. 9 and 10. Thus, the plurality of devices 10, 10' are configured to traverse the object together, with the arm segments 35a, 35b being bendable/rotatable at the rotators 40a, 40b, 40c and linkage points 42 as required. This can occur by having one of the devices 10 being used as a supporting base for the entire apparatus, and allowing for the elongate arm segments 35a, 35b to stretch the device 10' out and onto an object, when in a working (or open) state. Thus, in the working state, once the device 10' grips onto the object, the object itself can be used as an anchor point, to then allow for the device 10 to be moved onto the object, thereby allowing for the entire apparatus to then traverse the object via the gripping arrangements 15.

Figure 11:
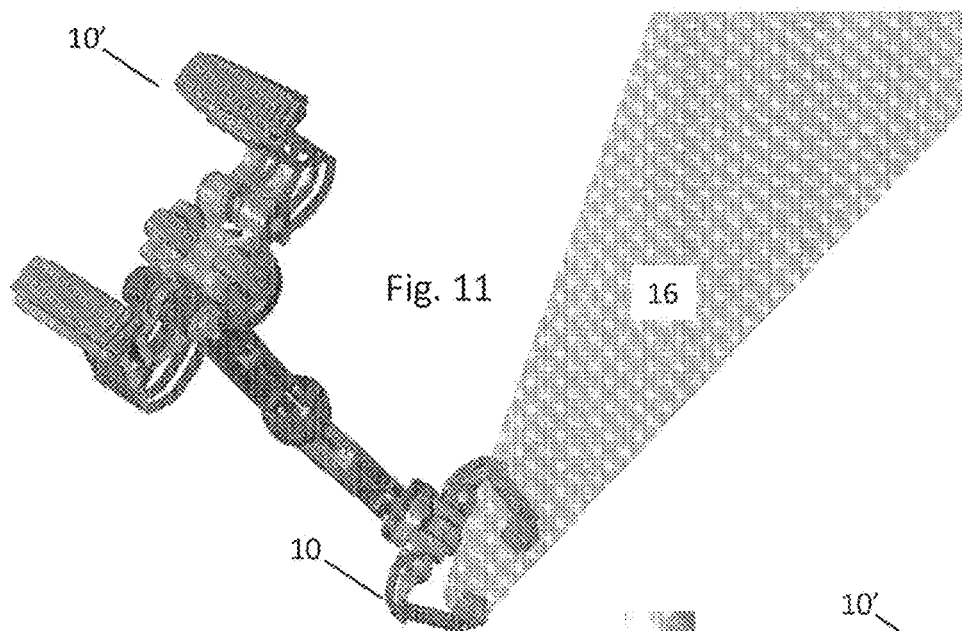
FIG. 11 is a schematic showing the devices of FIG. 9 traversing an object.
Figure 12:
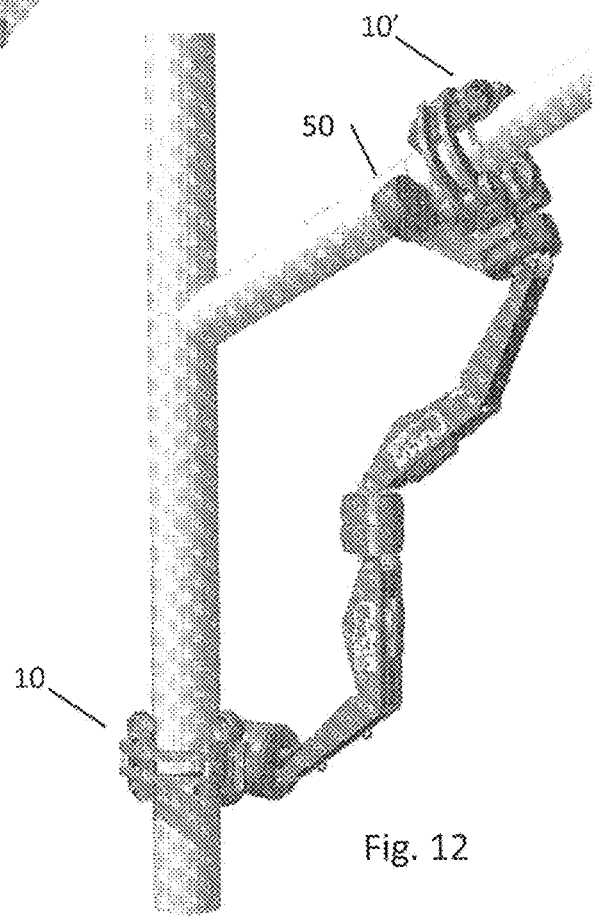
FIG. 12 is a schematic showing a pair of devices co-operatively operating to sever a limb of an object to which the devices are anchored.
Figure 13:
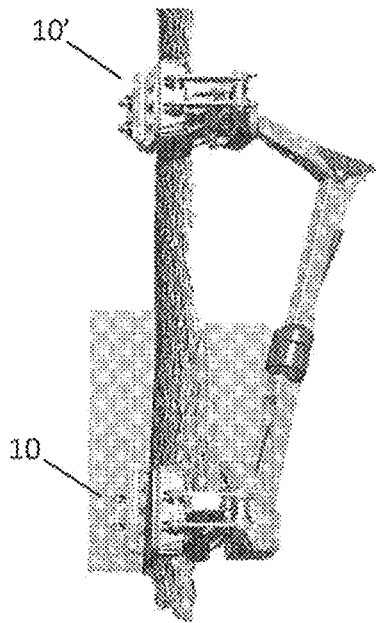
FIG. 13 is a schematic showing the pair of devices 12 anchored to a tree.
Figure 14:
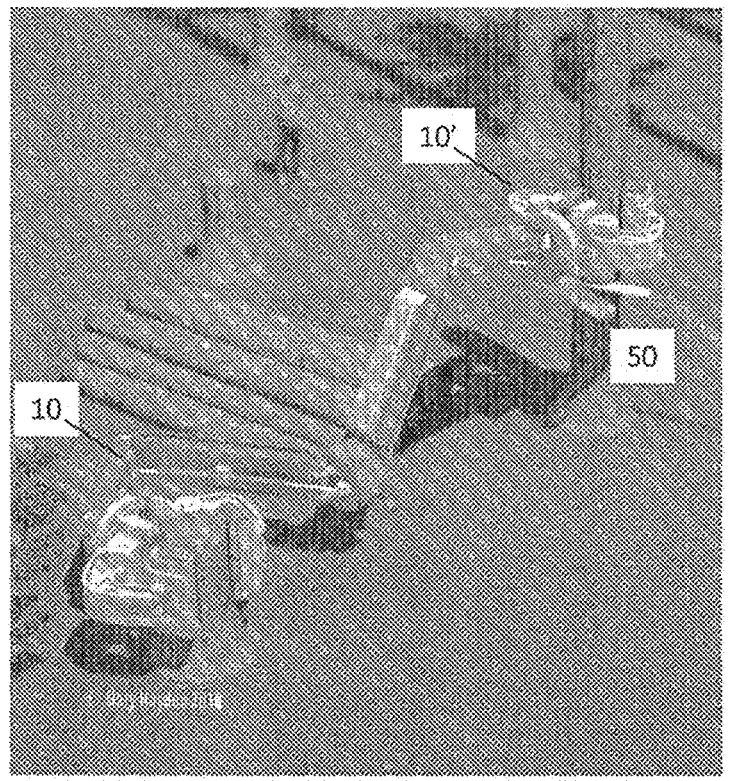
FIG. 14 is a schematic showing the pair of devices anchored to separate trees.

For example, FIGS. 11 and 12 show the pair of devices 10, 10' traversing an elongate pole 16 for cutting off a limb using the cutting tool 50, as previously described with reference to FIG. 4. FIG. 13 shows the pair of devices 10, 10' anchored to a tree, while FIG. 14 shows device 10 anchored to a stump of one tree while a cutting tool 50 on the paired device 10' does work on an adjacent tree.

As shown in FIG. 10, the pair of devices 10, 10' may be moved to a collapsed position, wherein the continuous tracks 28 are in contact with a ground surface. In this configuration, the tracks 28 can be actuated such that the device pair 10, 10' can traverse over the ground surface (e.g. for moving to or from the object).

Figure 15:
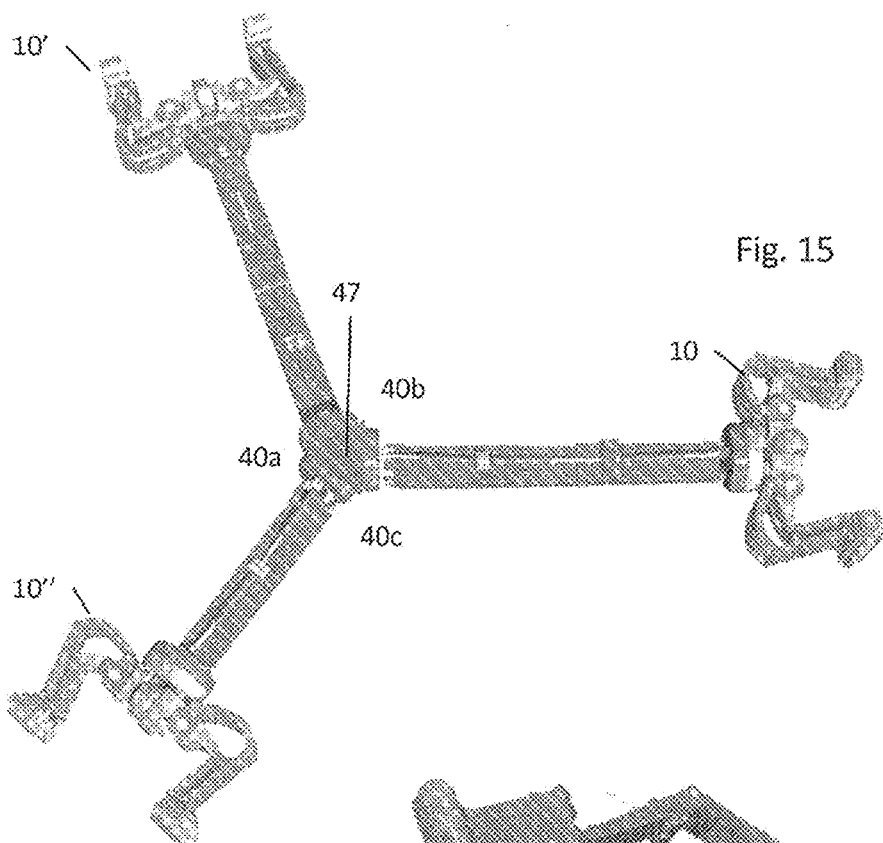
FIGS. 15 and 16 are perspective schematic views of a plurality of the FIG. 1 devices coupled together, in accordance with yet a further embodiment.
Figure 16:
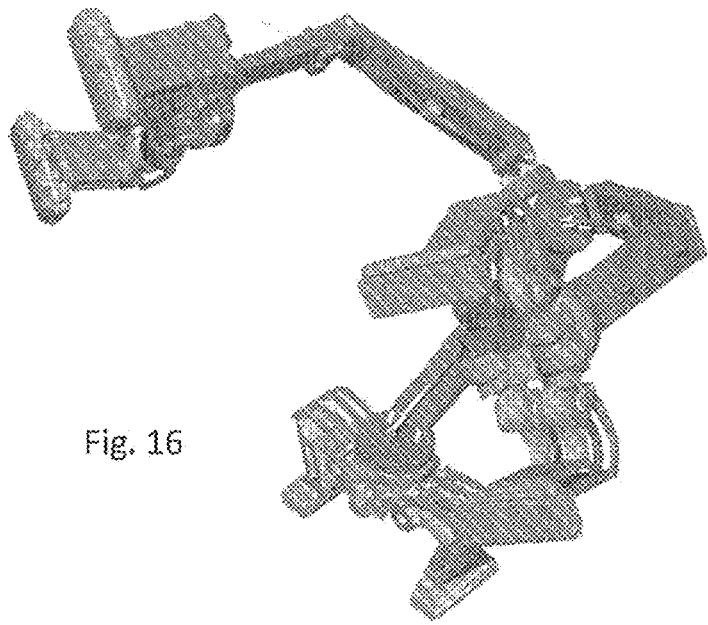

FIGS. 15 and 16 shows three devices 10, 10', 10'" coupled together by way of a number of pivotable rotators (e.g. as previously described with reference to FIG. 5b) mounted to a body 47. It will be understood that any number of the devices can be coupled together depending on the desired implementation.

It will be appreciated by persons skilled in the art that although the object that may be traversed can be any number of different objects, the device can be adapted to traverse elongate objects, such as trees, utility poles and/or buildings.

As previously mentioned, the device 10 can include a number of actuators, such as motors (e.g. internal combustion or electric motors), pneumatic arrangements, hydraulic arrangements, and the like for powering the rotating, bending and driving elements of the device 10. According to one form, the various actuators may be provided remotely of the device for providing power remotely. For example, where the device 10 implements a pneumatic cylinder for pivoting the grappling arms 20A, 20B, a hose may connect the cylinders to an air compressor or other suitable motor located on the ground (i.e. separate of the device 10).

The device 10 can include a control unit which is in electrical communication with each of the actuators, wherein the control unit can electrically control the actuation of the various actuators. In one form, the control unit may be a processing system or the like. Additionally, the device 10 may be configured to be remotely controlled by a user. Thus, in one example, the processing system may include a wireless receiver configured to receive a remote control signal, for controlling the device. The processing system can be embedded anywhere in or on the device 10, and can operate wirelessly to control different devices (e.g. as shown in FIGS. 9 to 16), or alternatively connections may be provided along the arm segments 35.

Figure 17:
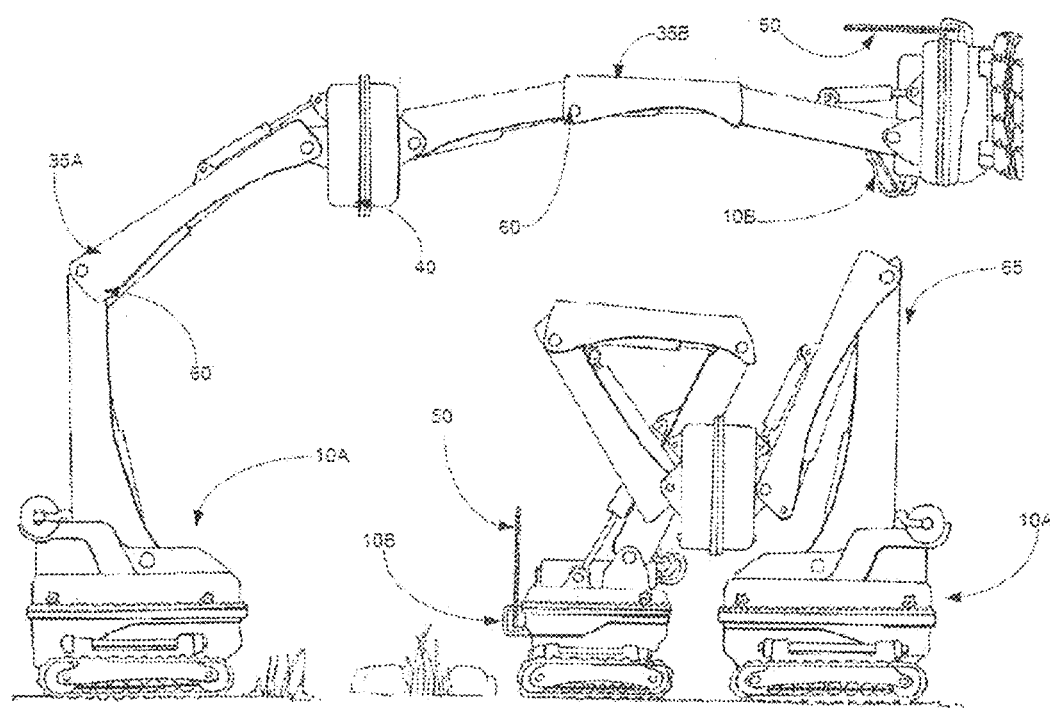
FIG. 17 is a schematic of a pair of devices coupled together in both working and stored states, accordance to an embodiment.

FIG. 17 shows yet a further example of a device 10A being operatively connected to another device 10B. In this particular example, the arm segments 35A, 35B are bendable at various linkages/joints 60, in order to allow for the entire apparatus, including the devices 10A, 10B to be collapsible into a stored state as shown at 65.

It will be appreciated by persons skilled in the art that the device 10 described herein can generally be mechanical in nature and can include a varying number of booms, arms, rotators, attachments, power units, and the like, as required. Furthermore, the device can include optional equipment such as environmental sensors for detecting overload conditions which may, for example, cause the device or devices to return the arm(s) 35 to a safe working state whereby the load will not affect the stability of the device(s).

It will further be appreciated that the device can also be manufactured in different sizes, material compound and weight (that is, the device can be a particular weight as required. Thus for example, the device may be light or heavy depending on the application.). For example, the arms may be formed of steel, plastics (e.g. for insulating the device), carbon fibre and the like.

The device can also operate in all different environments, either remotely, or by riding the device via an operator's work station which can be supported on the device.

Notably, as described herein, the device 10 can be designed as a work tool, although can also be applicable for other purposes such as and not limited to, play, entertainment, and work.

Additionally, the device 10 can be used in industries such as exploration, arboriculture, electrical, demolition, building, fire control, rescue, logging, fencing, army, and the like.

As also described herein, the device 10 can have a variety of modular components, which can be attachable/detachable together, thus allowing a varying number of ways for the device to move, travel, connect to objects, or respond to remote control activation. Thus, the device described herein may have the ability to move along the ground, along buildings, up and down trees, power poles, and the like, due to its ability to use a fixed structural object as its anchoring point. Thus, varieties of movements which can be provided include front steer, rear steer, crab steer, articulate forward, backward, sideways and in some circumstances pivot.

Furthermore, the device can have a variety of attachments. For example, the device can include one or more sensors, wherein sensor signals may be used as input to the processing system to automate traversal of the device.

Figure 19:
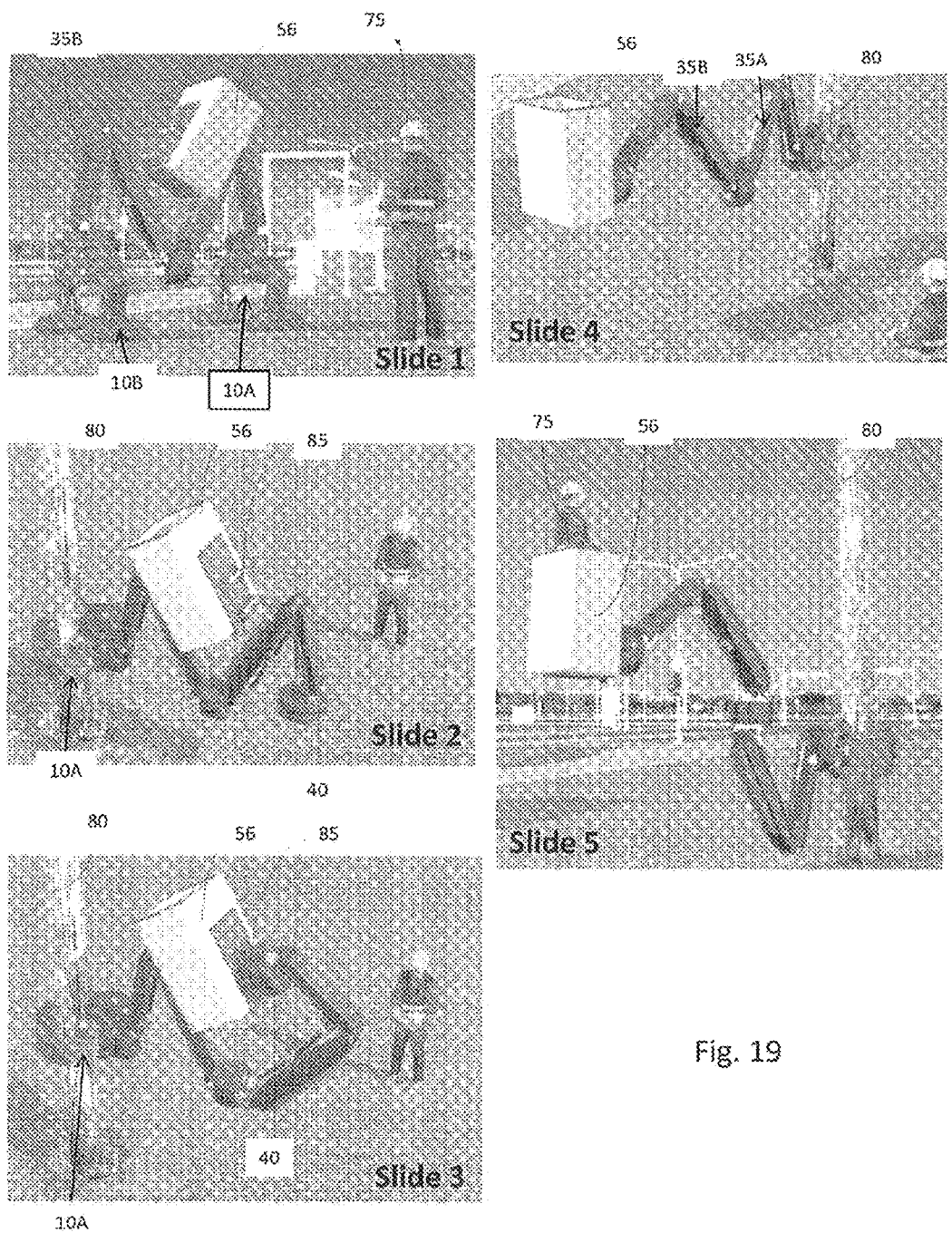

Furthermore, the device can be used to traverse objects of great height. An example of this is shown in FIG. 19. In this particular example, the device 10A is used to carry a person 75 to the top of a telegraph pole 80 (such as an electrician, or the like, who may need to access wires). Thus, the device 10A can have attached to the elongate body 35A, a container 56, for carrying the person 75. Thus, the device 10A can be configured to grip onto a telegraph pole 80. In this particular example, the device 10B at the other end, is detachable from the body 35B, and in particular the rotating disk 40, to allow for the disk 40 to be coupled at 85 to the container 56, for disconnecting the container 56 from the elongate body 35A, when traversing the pole 80. This can then allow for the container 56, with the person 75, to be held by the elongate bodies 35A, 35B, away from the pole 80.

Figure 20:
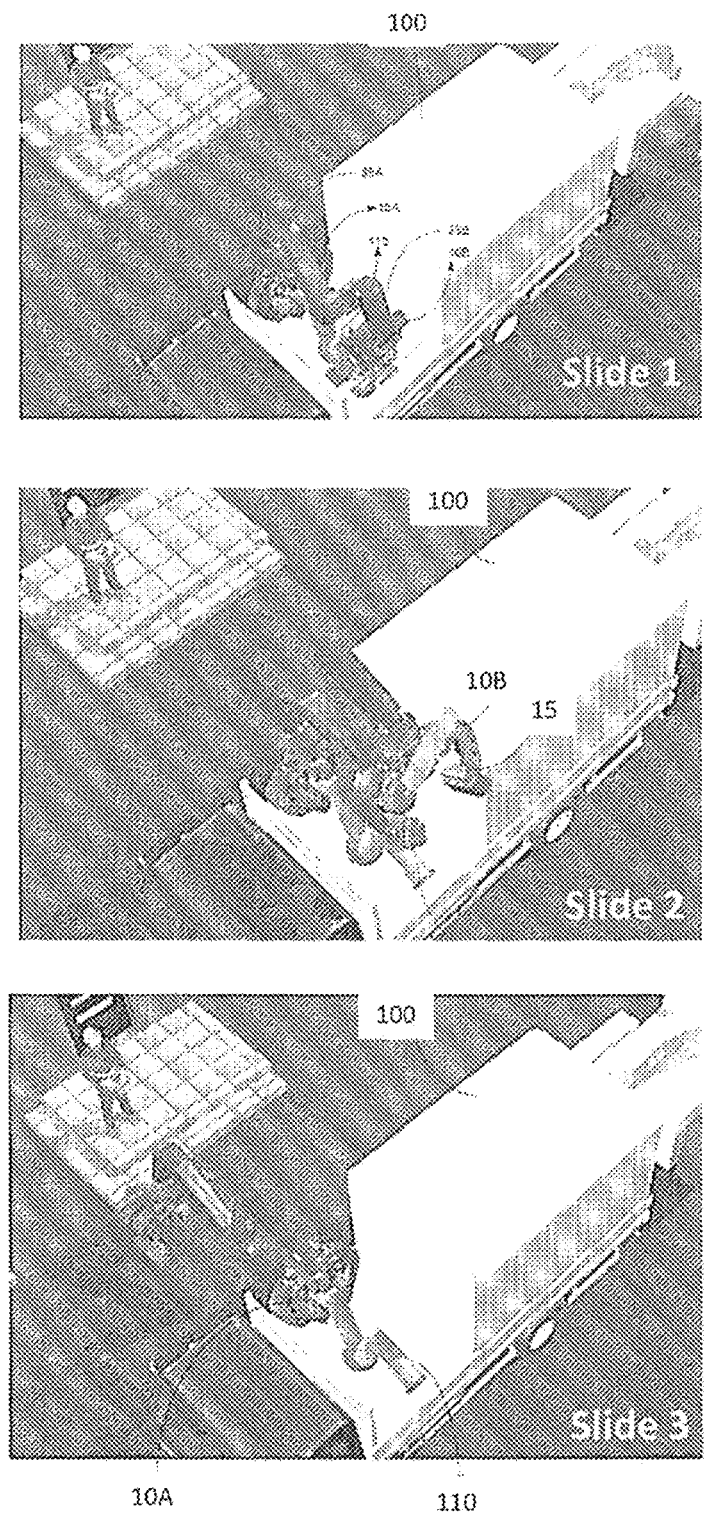

FIG. 20 shows other examples of the device 10A, 10B and in particular, an example of how the device can be transported. In this particular example, the device 10A, 10B is provided on the back of a truck or trailer 100. The truck can include a stabilising mechanism 110, such as a steel bar, or the like, which can be gripped onto by the various gripping arrangements 15. The gripping arrangements 15 can disconnect from the stabilising mechanism 110, as required. Notably, the stabilising mechanism 110 can be shaped to compliment the shape of the device 10A, 10B and the elongate bodies 35A, 35B, when in this stored, non-operative position.

Figure 21:
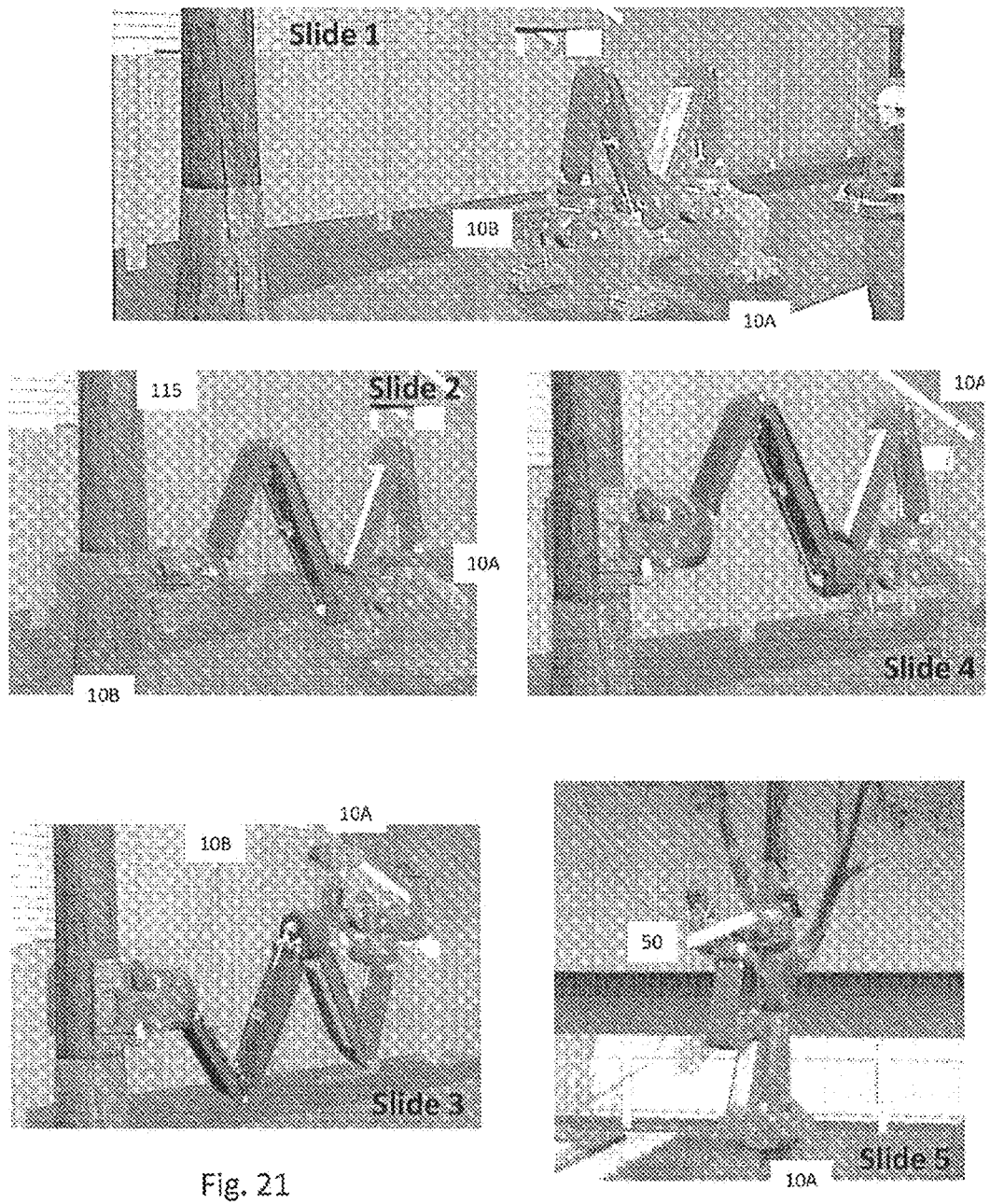
Figure 22:
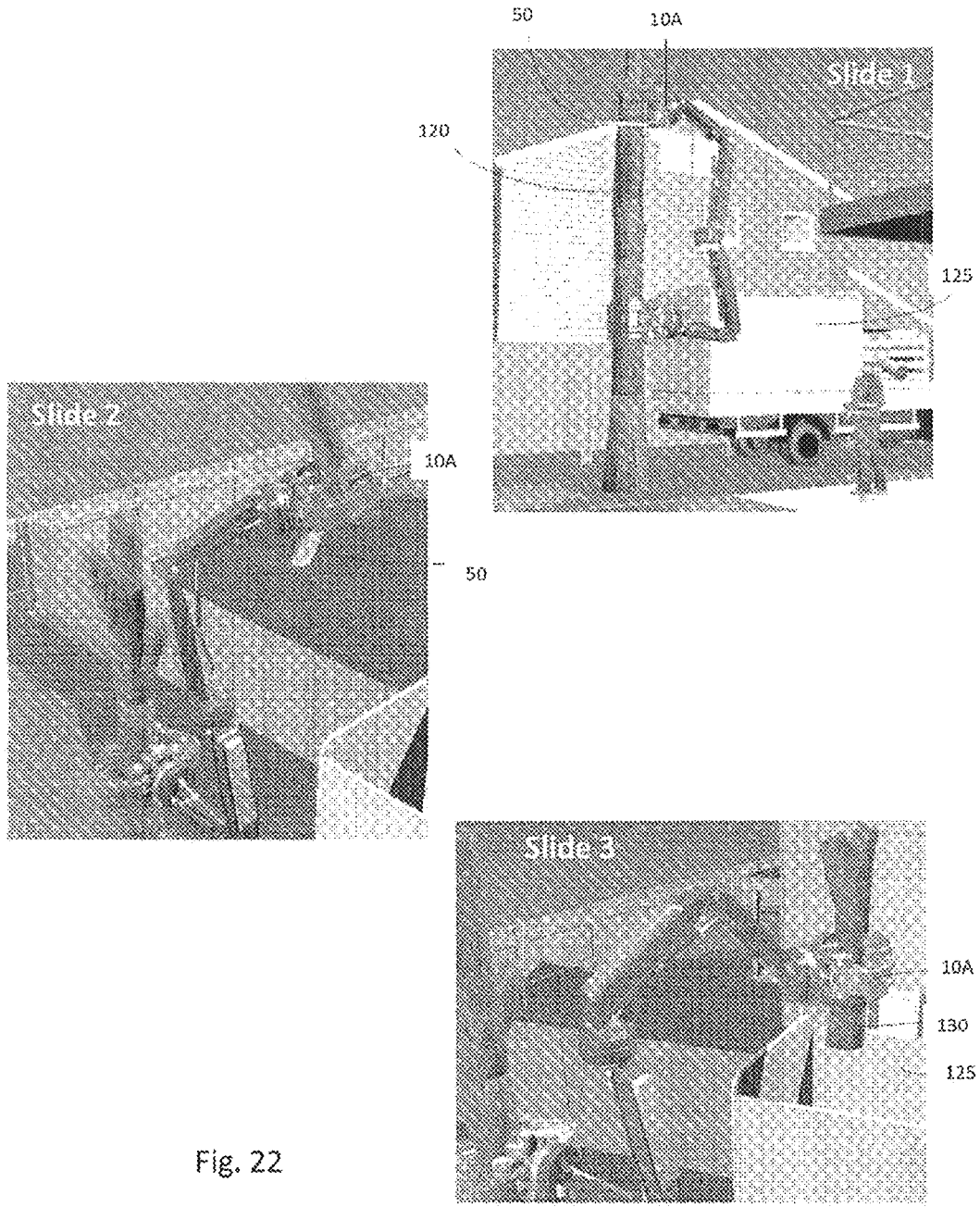

FIG. 21 shows another example of the device 10A, 10B being used as a tool, to cut down a tree and/or branches thereof. Thus, in this particular example, the device 10A includes a tool 50, which in this example is a saw. The device 10A, 10B is configured to traverse the tree 115 until it reaches the required branch.

Furthermore, FIG. 21 shows that the device 10A, 10B can be used to cut an entire tree base 110. This can include, holding a portion 130 of the tree base 120 over a waste container 125, and at least partially releasing the grip and allowing for the portion 130 to incrementally drive through the grip and be sawed at the various increments.

Further Examples

It will be appreciated that many variations of the device for traversal, described herein may be possible. The following are further examples, which are considered to fall within the scope of the present application.

According to one example, the various parts of the device, the elongate arms, and the like can be modularly detachable/attachable to each other. Thus, the overall apparatus may be transported to and then assembled at a worksite (such as at the telegraph pole). This can be advantageous in situations where a worksite is difficult to access. It will further be appreciated that either manual or automatic detachment of the modular components may be possible.

Furthermore, it will be appreciated that the device described herein is not limited to a particular size. The device can be implemented depending on the application. Thus, a relatively large device may be used for large industrial wood chipping projects, or for carrying a workman up a telegraph pole (e.g. as per FIG. 19). Whereas, a domestic tree grooming situation may only require a relatively small device.

In another example, the elongate body of the device can be extendable and is able to reach out. Thus, for example, if the elongate body includes a working tool (such as a saw or the like) at one end, the elongate body may be telescopically able to extend out to reach a branch of a tree, or a like.

It will further be appreciated that many types of devices are shown in the Figures, and that an unlimited number of devices attached by respective elongate bodies may be possible. Thus, for example, the device 10 may include an elongate body with a gripping arrangement at one end and a working tool at the other end. Alternatively, the device may be operatively connected to one or more other devices, as hereinbefore described.

Furthermore, the device 10 may be implemented to include or carry one or more working tools. Thus, for example, if being used in a fire-fighting situation, the device may include a fire hose. It will be appreciated that many other working tools may be included, such as for example, containers on the device including chemical for spraying over a particular object or area, and the like (e.g. using the spray hose attachment shown in FIG. 8).

In yet another example, the device 10 may be powered by different mechanisms. Thus, for example, the device may include a power unit connected thereto, or solar panels which can be act to power hydraulic leads which move the body of the device. It will be appreciated that the device can move and/or be powered by a variety of methods, including and not limited to providing power hydraulically, which can include movement by pressure from any gas or fluid (such as by air).

According to one other example, the device 10 described herein may be remotely controlled by a user. In yet a further example, the device may be an intelligent system which can sense its environment and act/react accordingly. Thus, the device 10 may have one or more sensors, cameras, or the like and can thus be moved by a remote user as required. This may be particularly advantageous if being used in military operations or the like. In yet another example, the device 10 may be able to read barcodes on trees, which have been identified as requiring grooming, and thus the device can automatically move to a tree with the appropriate barcode to initiate the grooming process. Thus, other systems such as location identification systems (for example, the Global Positioning System or GPS), and processing systems, can be used in conjunction, with, built in the device as required.

Furthermore, although the presently described device can be controlled remotely, such that a user is physically removed from a potentially dangerous situation, it will also be appreciated that the device 10 may also be implemented such that it is able to carry a user. Thus, in one example a user of the device may be able to ride the device to a worksite. In another example, the device may be able to carry one or more passengers. This can be applied in a rescue operation, for example.

In accordance with yet another example, it will also be appreciated that the device 10 may attach or be connected to an object it is traversing by one or more other attachment points, which may not be associated with the gripping arrangement. Thus, for example, the device may also include, anywhere along the elongate body (or at one end), a still grab which can have a magnetic or sucking or hand-like structure, for grabbing the object (e.g. for additional anchoring and traversing of the device).

Figure 18:
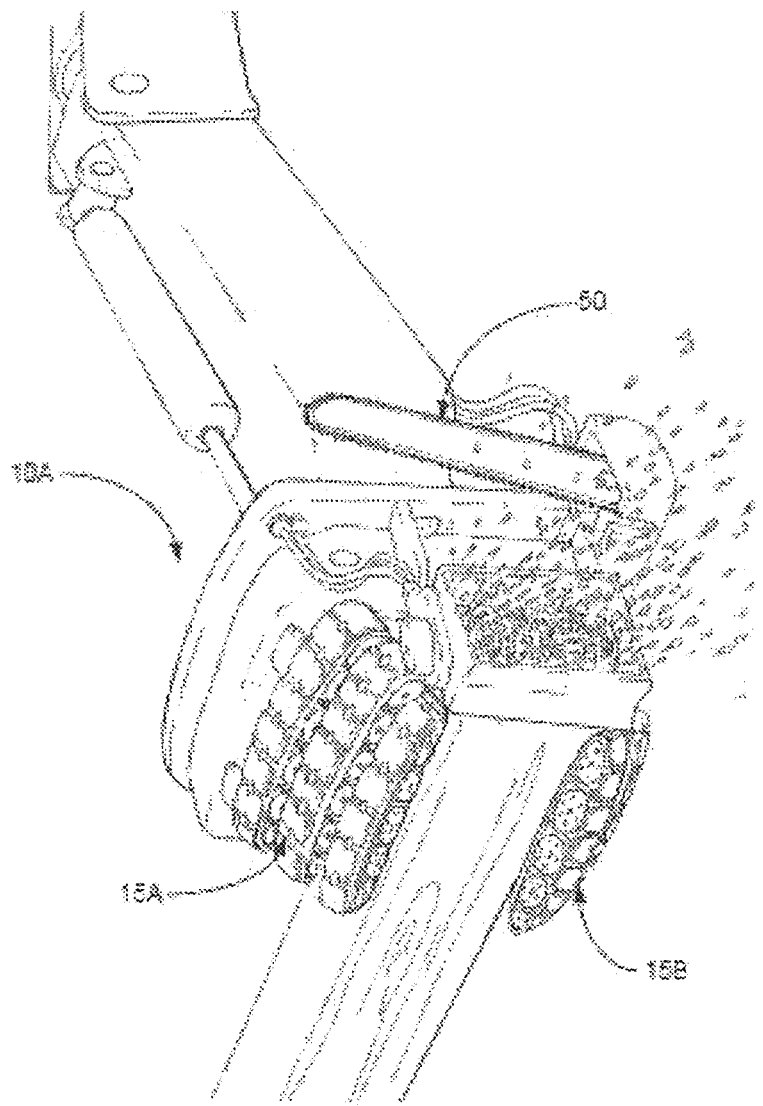
FIGS. 18 to 22 are illustrations of example uses of one or more devices in accordance with embodiments.

In yet a further example, and as shown in FIG. 18, the tool can include a wood mulching arrangement. Thus, in one example, the tree branch or wood can be driven through the mulching arrangement, where the gripping arrangement 15 can act as a feeder. In yet another example, once a tree branch is severed, the gripping arrangement 15 may be detachable and can be lowered with the branch, down to the bottom of the tree. In yet an alternative example, the mulching arrangement can include a hose or the like, attached thereto, for collecting woodchips as the branch is being chipped by the device 10. The hose can work with a suction mechanism for clearing away the woodchips, as the device is sitting in the tree. Additionally, when cutting a branch, the device may further include load sensors to promote safe working environments.

It will be understood that the means used to displace/pivot the grappling legs 20a, 20b and various linkages may be other than hydraulic cylinders and could be any form of displacement means suitable for effecting the movement depending on the desired implementation (e.g by way of rotary tilt hitch or slew rings).

Figure 23:
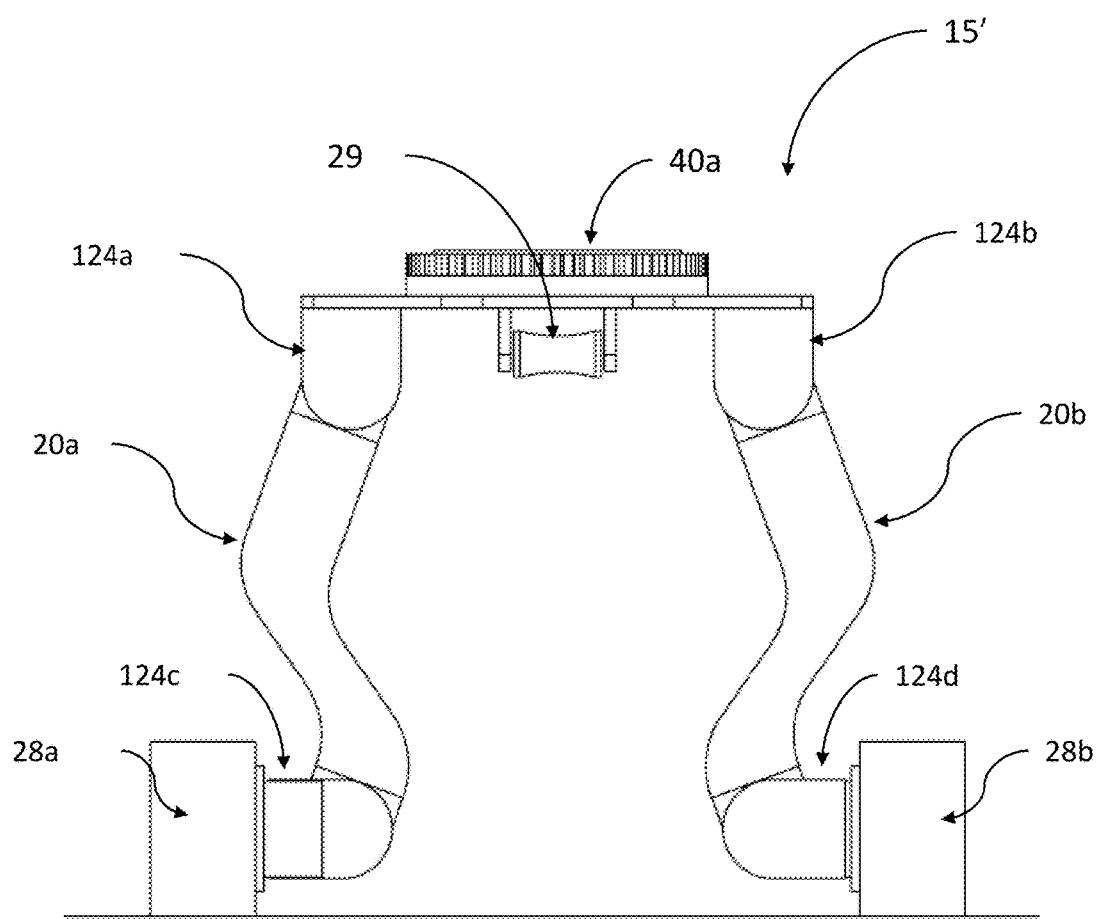
FIG. 23 is a schematic of a gripping arrangement in accordance with an alternative embodiment of the invention.

Such an alternative configuration is shown in FIG. 23. It will be understood that the gripping arrangement 15' shown in FIG. 23 can be coupled to one or more other gripping arrangements by way of a manipulatable arm, in the same manner as described for previous embodiments. A rotator 40a is provided for rotatable coupling to the arm 35. Although not shown in FIG. 23, the rotator 40a is coupled to, or integrated with, a tilting actuator (not shown) to allow the gripping arrangement 15' to be both pivotally and rotatably coupled to the arm. In a particular form, the rotator 40a and tilting arrangement may take the form of a rotary tilt hitch that facilitates ready removal and fastening of the gripping arrangement 15' to the arm.

In the alternative configuration shown in FIG. 23, the gripping arrangement 15' comprises a pair of grappling legs 20a, 20b that are movable between an open and closed state by way of a pair of high torque rotary actuators 124a, 124b. An additional pair of high torque rotary actuators 124c, 124d are provided on the grappling leg end portions 26a, 26b for tilting the drive means 28a, 28b into a desired position (either for gripping and/or driving). According to the illustrated embodiment, the rotary actuators 124a, 124b, 124c, 124d are hydraulically powered (although they may be pneumatically, electrically or otherwise suitably powered) and configured to provide a variable degree of rotation. A particular advantage of using a set of rotary actuators as shown in FIG. 23 is that they may each be controlled to share the load and provide a high holding tourque for reliably gripping the object. In one embodiment, the control unit may monitor and adjust the level of torque applied by each actuator. In an alternative embodiment, a suitable valve configuration may be disposed inline between each of the rotary actuators 124a to 124d and the hydraulic source to ensure that each of the actuators is applying roughly the same gripping force to the object.

FIGS. 24a through 24d each show front and side views of the gripping arrangement 15' with the grappling legs 20a, 20b transitioning between an open and closed state for navigating across a ground surface.

Figure 24A:
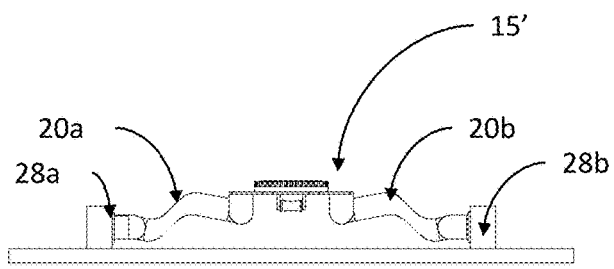
FIGS. 24a to 24d show the gripping arrangement of FIG. 23 in various positions.
Figure 24A:
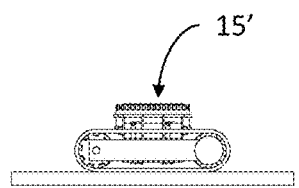
Figure 24B:
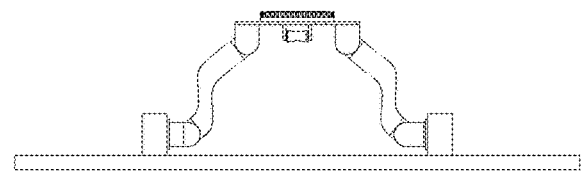
Figure 24B:
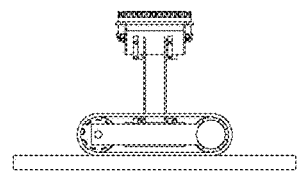
Figure 24C:
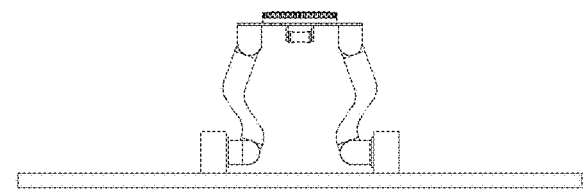
Figure 24C:
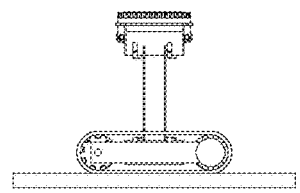

More particularly, in FIG. 24a, the grappling legs 20a, 20b are in a fully open configuration with the drive means 28a, 28b respectively titled so that the tracks (or other suitable running gear) run parallel to the surface. The amount of tilt may be dynamically controlled (i.e. by adjusting the rotary actuators 124c, 124d) for allowing the gripping arrangement 15' to safely and stably travel over uneven ground. It will be understood that the drive means 28a, 28b may be tilted inwardly (i.e. by 180 degrees in the opposite direction to that shown in FIG. 24a) depending on the desired configuration.

Figure 24D:
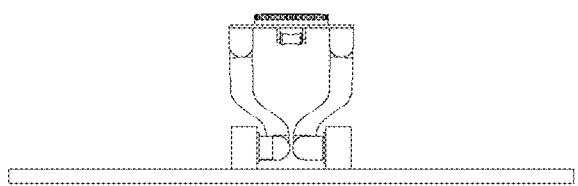
Figure 24D:
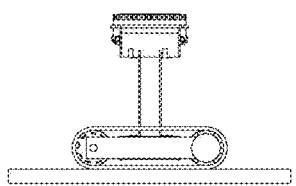
Figure 25A:
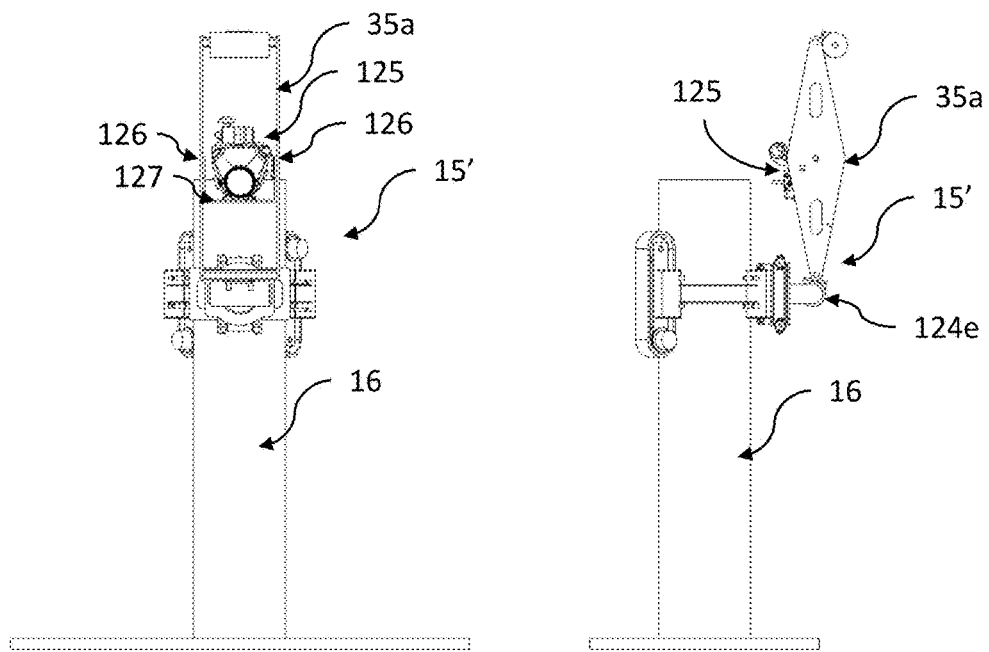
FIGS. 25a to 25d show a gripping arrangement coupled to a manipulatable arm scaling an object.
Figure 25B:
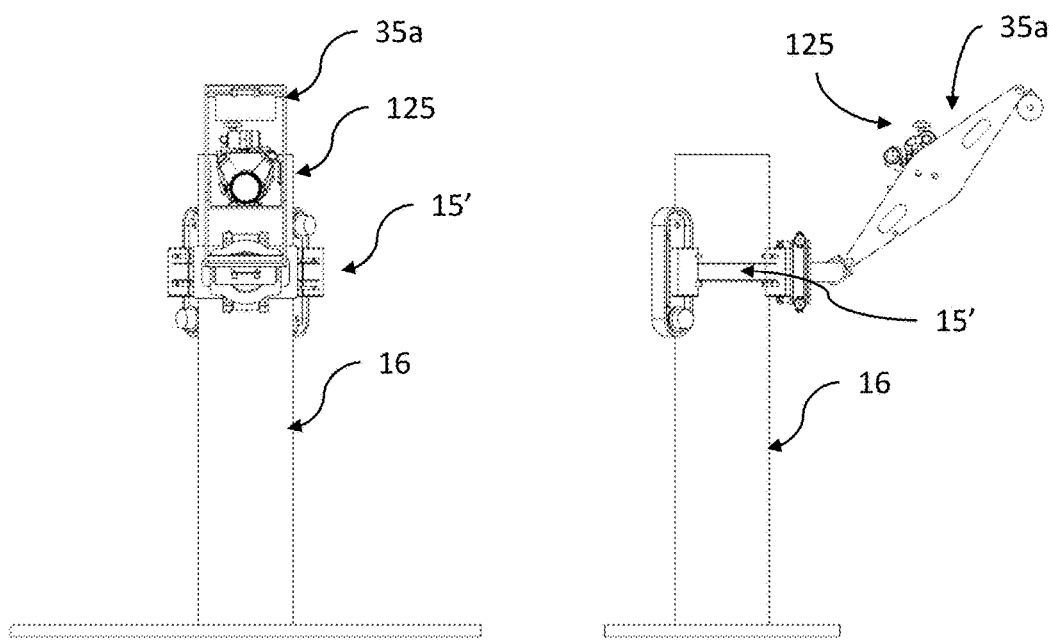
Figure 25C:
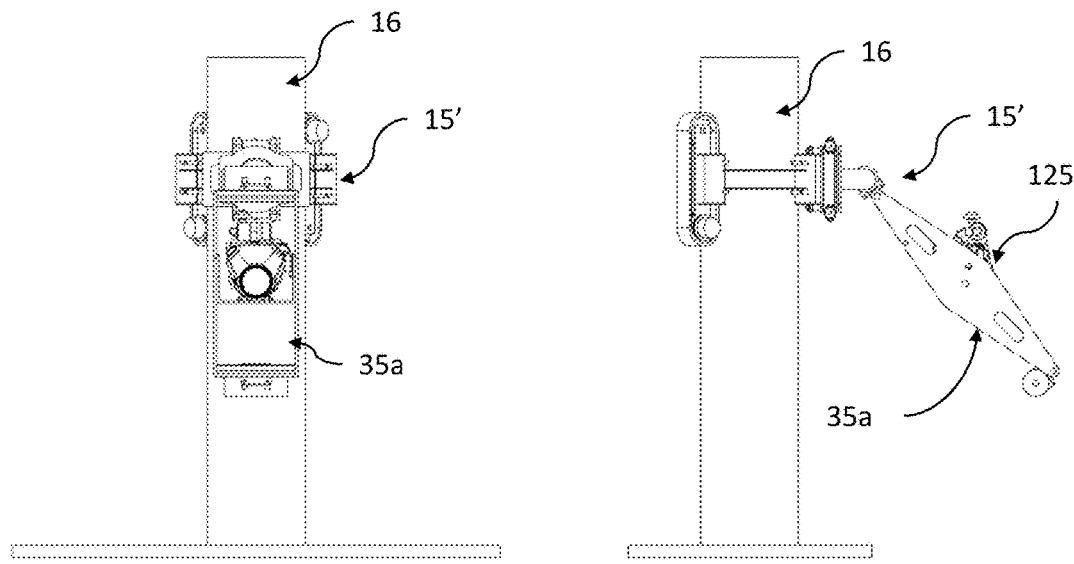
Figure 25D:
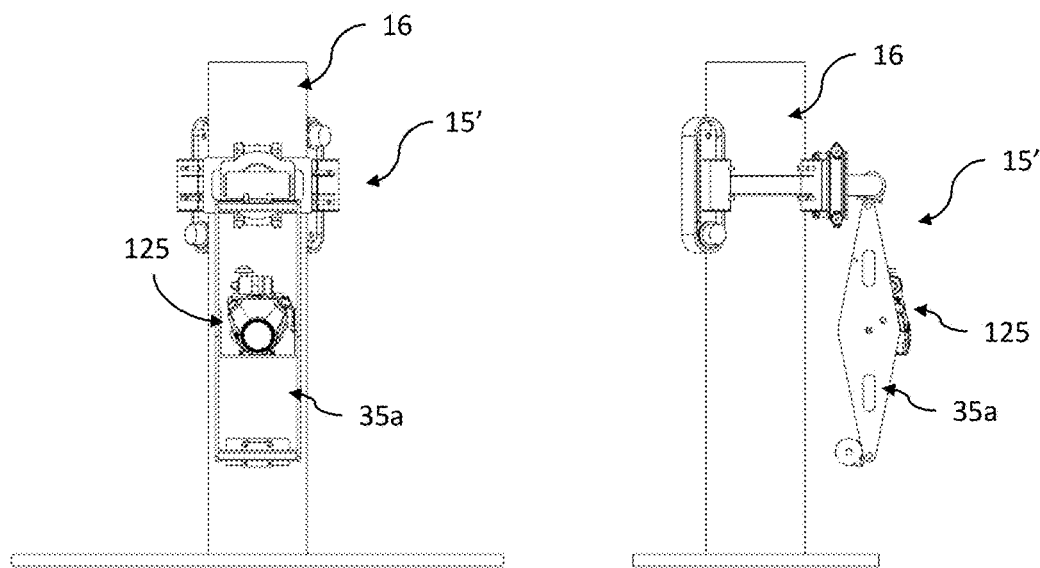

FIGS. 24a to 24d show the legs 20a, 20b being progressively brought thereby allowing the gripping arrangement 15' to travel through narrow passages. In FIG. 24d the legs 20a, 20b are entirely closed, either for allowing the gripping arrangement 15' to travel through a particularly narrow pathway, or for storage (as will be described in more detail in subsequent paragraphs).

FIGS. 25a to 25d serve to illustrate a configuration whereby a motor 125 (i.e. for powering the various actuators, such as rotators 30, rotary actuators 124, etc.) is located on a manipulatable arm portion 35a attached to the rotator 40a of the gripping arrangement 15' by way of a rotary actuator 124e. For ease of reference, only a first arm portion 35a is shown in FIGS. 25a to 25d, though it will be understood that the first arm portion 35a can connect to one or more other arm portions that in turn can connect to one or more other gripping arrangements 15, 15' in the same manner as described in previous embodiments. The motor 125 may, for example, be a petrol or diesel motor that is configured to power a compressor for driving the various actuators. The motor may be mechanically coupled to a gearbox that is in turn connected to a pump for suppling fluid to the hydraulic actuators. By way of example, the gearbox could be configured to reduce the shaft speed from 3200 engine rpm to 2000 pump rpm. According to the illustrated embodiment, the weight of the motor 125 is biased toward its base where the oil sump may be located.

Figure 26:
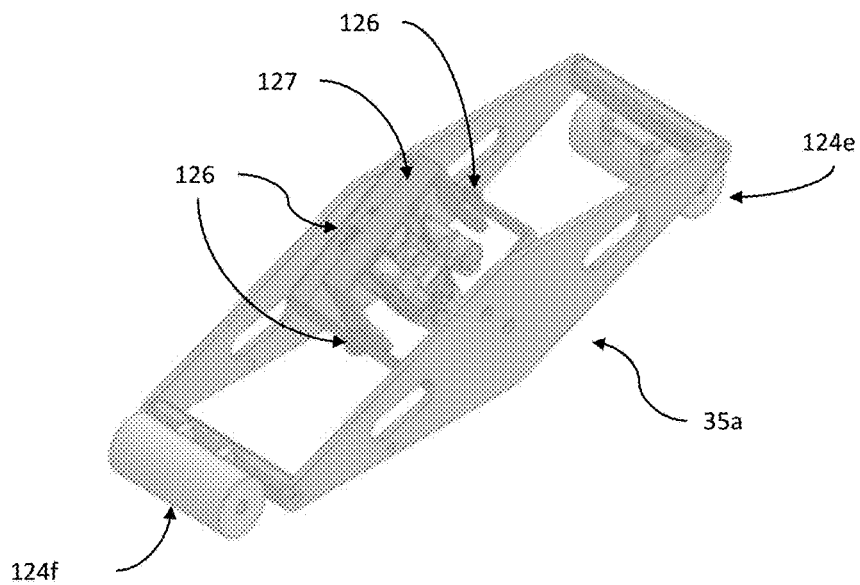
FIG. 26 is a schematic of a manipulatable arm segment coupled to a motor, in accordance with an embodiment.

According to the illustrated embodiment, the motor 125 is bolted or otherwise secured to a body 127 that locates within the arm portion 35*a*. The body 127 is in turn connected to the arm 35*a* by way of swivel joints 126 located on either side of the body 127 and respectively coupled to opposing walls 128 of the arm portion 35*a*. As shown in FIGS. 25*a* to 25*d*, the swivel joints 126 allow the motor 125 to maintain an upright position (due to the afore-mentioned weight bias), thereby allowing it to be operational irrespective of the orientation or position of the arm portion 35*a*. According to a particular embodiment, the body 127 may take the form of a gimbal having first and second arms with orthogonal pivot axis, such as shown in FIG. 26.

In an alternative configuration, the swivel joints 126 may comprise actuators that can be powered and controlled to rotate/swivel by a desired amount to ensure that the motor 125 is maintained in a generally upright position. By way of example, the powered swivel joint 126 may incorporate a high-resolution encoder that allows for its rotation to be known at any time. The control unit may communicate with a gyroscope or other suitable sensor mounted to the arm portion 35*a* or motor 125 to determine a relative orientation of the arm 35*a*/motor 125 and instruct the swivel joint(s) 126 to dynamically rotate the motor 125 to maintain its upright orientation.

A further advantage of keeping the motor 125 in a fixed position is that the power lines to the various actuators (whether they be electrical lines, pneumatic lines or otherwise) may be prevented from becoming entangled during movement of the device which could otherwise occur as a result of substantial arm movement.

Figure 27:
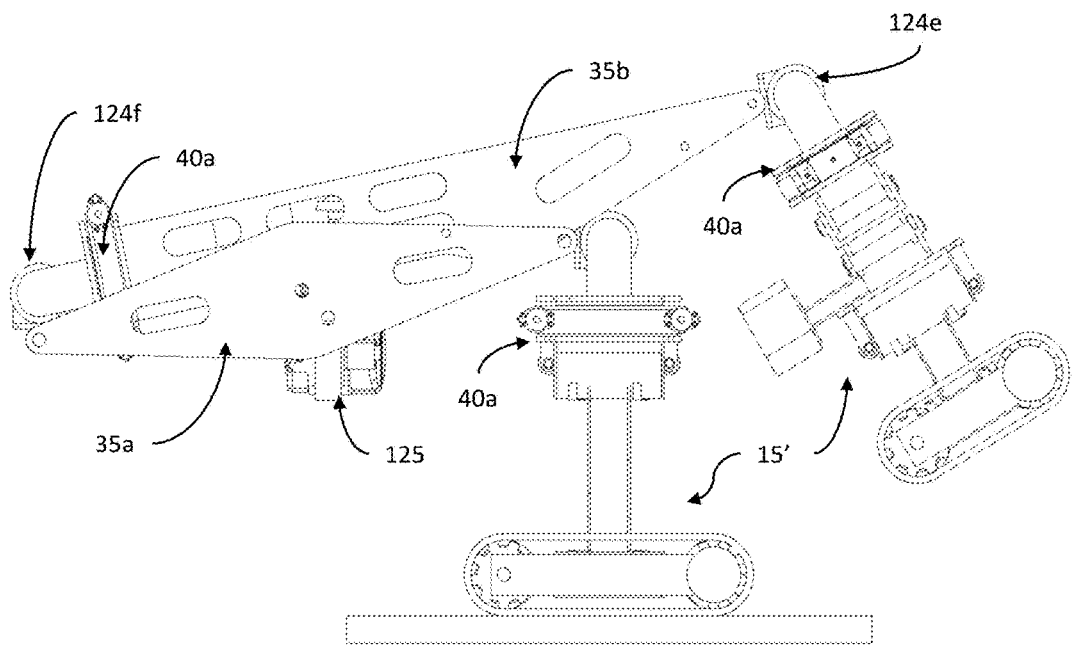
FIG. 27 is a schematic of an apparatus having two devices attached together by way of a manipulatable arm arrangement, in accordance with an embodiment.

With additional reference to FIG. 27, there is shown a pair of gripping arrangements 15', 15" coupled together by way of a manipulatable arm arrangement (in this instance comprising arm segment 35*a* and arm segment 35*b*). The gripping arrangements 15', 15" are shown in a configuration for transportation, access, maintenance or storage. The illustrated configuration may advantageously lower the centre of gravity for the apparatus, while also minimising its form. The folded configuration also allows for narrow access, low head room and increases the stability for both transport and drive modes. According to the illustrated embodiment, when in this configuration, the centre of gravity passes through the driving gripping arrangement 15'.

Figure 28:
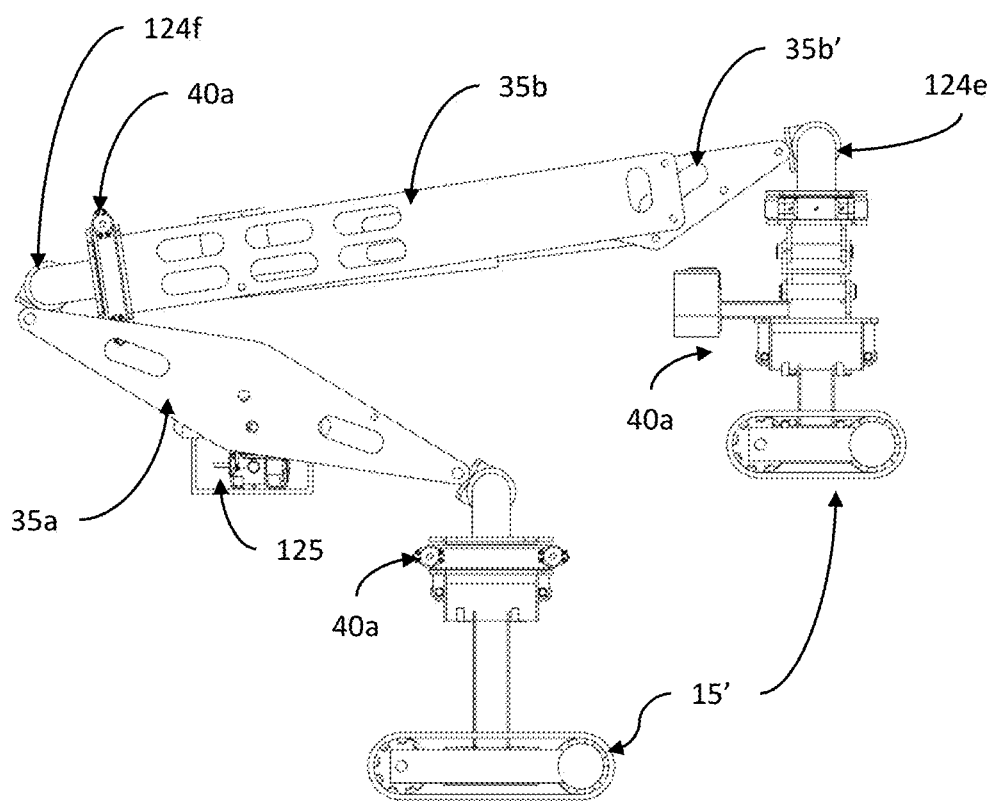
FIG. 28 is a schematic showing an apparatus having two devices attached together by way of a manipulatable arm arrangement, in accordance with a further embodiment.

FIG. 28 shows an alternative arrangement where one of the arm portions 35*b* comprises an extension arm 35*b*'. According to this configuration, the extension arm 35*b*' can be extended or retracted to adjust centre of gravity of the apparatus as necessary, for maintaining stability.

Figure 29:
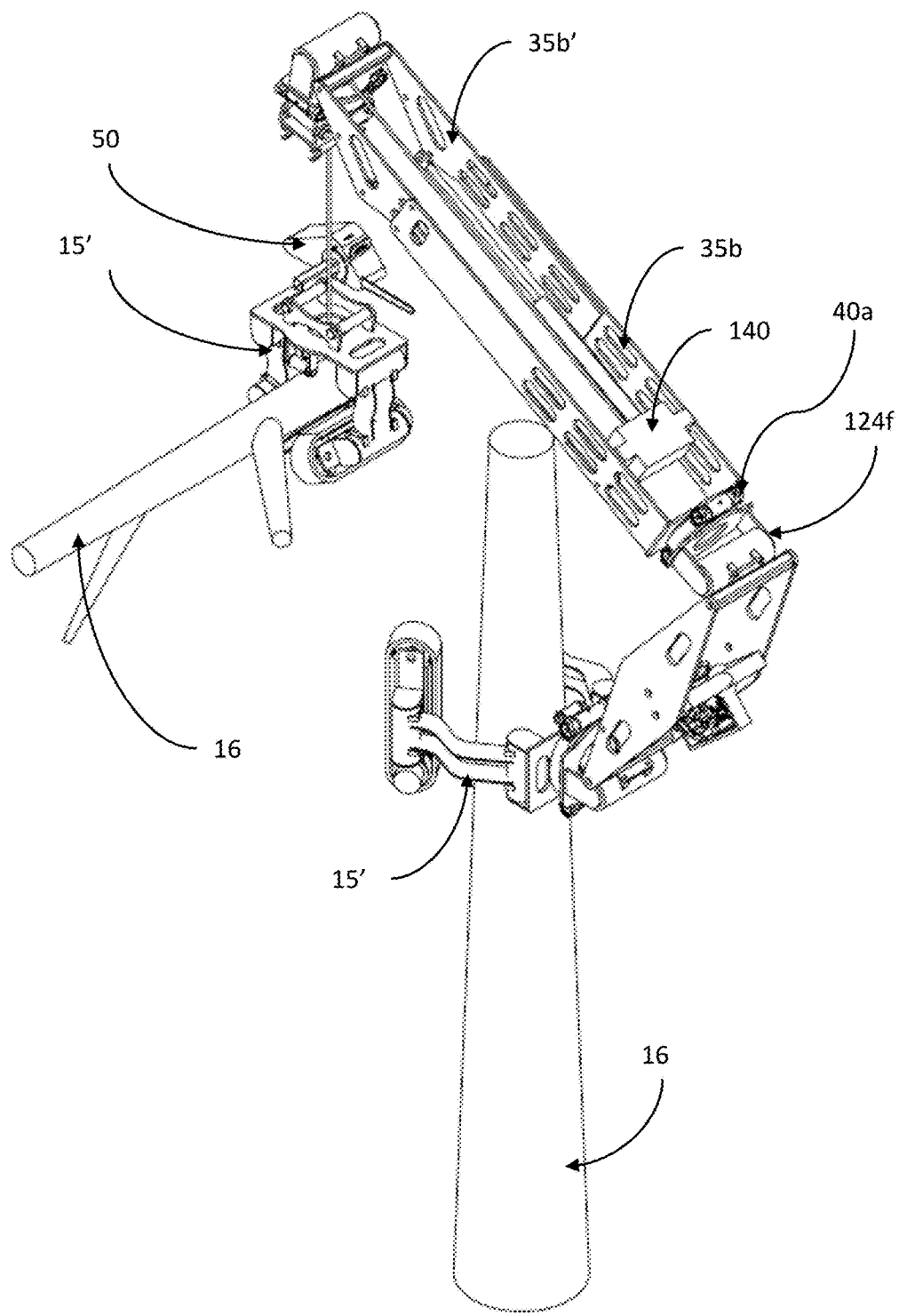
FIG. 29 is a schematic of the apparatus of FIG. 28 scaling an object, in accordance with an embodiment.

FIG. 29 shows the arrangement of FIG. 28 attached to a tree 16. One of the gripping arrangements 15' incorporates a chainsaw 50. Once a tree section is severed, the gripping arrangement 15' may be detached (e.g. at the rotary tilt hitch 40*a*/124*e*) and can be lowered with the branch, down to the bottom of the tree 16. According to the illustrated embodiment, a winch 140 is located on the arm segment 35*b* and attaches to a body of the gripping arrangement 15' for facilitating lowering. The winch 140 may be controlled by the control unit. As shown, the extension arm 35*b*' may advantageously be extended to provide a safe distance between the detached gripping arrangement 15' and limb while it is being lowered.

It will be appreciated that many modifications will be apparent to those skilled in the art without departing from the scope of the present invention.

The reference in this specification to any prior publication (or information derived from it), or to any matter which is known, is not, and should not be taken as an acknowledgment or admission or any form of suggestion that the prior publication (or information derived from it) or known matter forms part of the common general knowledge in the field of endeavour to which this specification relates.

In the context of this specification, the word "comprising" means "including principally but not necessarily solely" or "having" or "including", and not "consisting only of". Variations of the word "comprising", such as "comprise" and "comprises" have correspondingly varied meanings.

The invention claimed is:

1. A device for allowing work to be carried out on or about an object, the device including:

a gripping arrangement comprising a first gripping portion which is coupled to at least one second gripping portion by way of a manipulatable arm arrangement including multiple arm segments with adjacent segments arranged to pivot, rotate or simultaneously pivot and rotate with respect to one another, the first and at least one second gripping portions each comprising a pair of grappling legs coupled to respective rotary actuators, the rotary actuators operable to move the grappling legs between a closed state and an open state for respectively securing the gripping portion to and releasing the gripping portion from the object; and a controller for controlling the manipulatable arm arrangement and respective rotary actuators so as to allow the device to traverse the object for allowing work to be carried out, whereby the traversing is effected by securing one of the respective gripping portions to the object while another is pivotably, rotatably or pivotably and rotatably moved to a desired location on the object for subsequently securing thereto and wherein an amount of gripping force applied by each of the rotary actuators is controlled for suitably gripping the object.

2. The device according to claim 1, wherein the controller is further configured to monitor and control the amount of gripping force applied by each of the rotary actuators to the object.

3. The device according to claim 2, wherein the controller is configured to independently control the gripping force applied by each of the rotary actuators so as to ensure a load is proportionally distributed.

4. The device according to claim 1, wherein the amount of gripping force applied by each of the rotary actuators is controlled by way of a valve configuration.

5. The device according to claim 1, wherein the rotary actuators are each mounted to a body of the gripping portion and configured to move end portions of each grappling leg toward and away from each other.

6. The device according to claim 5, further comprising a drive means mounted to each grappling leg end portion for allowing the device to grip and move along the object while the grappling legs are in the closed state.

7. The device according to claim 6, wherein the drive means are mounted to the respective grappling leg end portions by way of a rotary actuator.

8. The device according to claim 7, wherein the controller is further configured to additionally monitor and control the amount of gripping force applied to the object by the rotary actuators mounted to the drive means.

9. The device according to claim 8, wherein the controller is configured to independently control the gripping force applied by all of the rotary actuators so as to ensure a load is distributed approximately equally.

10. A device for allowing work to be carried out on or about an object, the device including:
- a gripping arrangement comprising a first gripping portion which is pivotally and rotatably coupled to at least one second gripping portion by way of a manipulatable arm arrangement, the first and at least one second gripping portions each comprising a pair of grappling legs coupled to grappling leg displacement means, the grappling leg displacement means operable to move the grappling legs between a closed state and an open state for respectively securing the gripping portion to and releasing the gripping portion from the object; and
- a controller for controlling the manipulatable arm arrangement and grappling leg displacement means so as to allow the device to traverse the object for allowing work to be carried out, whereby at least one of the gripping portions is detachable from the manipulatable arm and wherein the device further comprises a winch coupled to the manipulatable arm that allows the detachable gripping portion to be lowered once detached.

11. A device for allowing work to be carried out on or about an object, the device including:
- a gripping arrangement comprising a first gripping portion which is pivotally and rotatably coupled to at least one second gripping portion by way of a manipulatable arm arrangement, the first and at least one second gripping portions each comprising a pair of grappling legs coupled to grappling leg displacement means, the grappling leg displacement means operable to move the grappling legs between a closed state and an open state for respectively securing the gripping portion to and releasing the gripping portion from the object;
- a controller for controlling the manipulatable arm arrangement and grappling leg displacement means so as to allow the device to traverse the object for allowing work to be carried out; and
- a motor for facilitating operation of the grappling leg displacement means and whereby the motor is mounted to the device by way of one or more swivel joints that allow the motor to remain upright irrespective of the orientation of the device.

12. A device for allowing work to be carried out on or about an object, the device including:
- a gripping arrangement comprising a first gripping portion which is coupled to at least one second gripping portion by way of a manipulatable arm arrangement including multiple arm segments with adjacent segments arranged to pivot, rotate or simultaneously pivot and rotate with respect to one another, the first and at least one second gripping portions each comprising a pair of grappling legs coupled to respective rotary actuators, the rotary actuators operable to move the grappling legs between a closed state and an open state for respectively securing the gripping portion to and releasing the gripping portion from the object; and
- a controller for controlling the manipulatable arm arrangement and respective rotary actuators so as to allow the device to traverse the object for allowing work to be carried out, whereby the traversing is effected by securing one of the respective gripping portions to the object while another is pivotably, rotatably or pivotably and rotatably moved to a desired location on the object for subsequently securing thereto and wherein the controller is further configured to monitor and control the amount of gripping force applied by each of the rotary actuators to the object.

* * * * *